(12) United States Patent
Mori et al.

(10) Patent No.: US 6,641,076 B2
(45) Date of Patent: Nov. 4, 2003

(54) WEBBING TAKE-UP DEVICE

(75) Inventors: Shinji Mori, Konan (JP); Akira Sumiyashiki, Nagoya (JP); Masakazu Hashimoto, Okazaki (JP)

(73) Assignee: Kabushiki Kaisha Tokai-Rika-Denki-Seisakusho (JP)

( * ) Notice: Subject to any disclaimer, the term of this patent is extended or adjusted under 35 U.S.C. 154(b) by 86 days.

(21) Appl. No.: 09/727,445

(22) Filed: Dec. 4, 2000

(65) Prior Publication Data
US 2001/0038054 A1 Nov. 8, 2001

(30) Foreign Application Priority Data
Dec. 6, 1999 (JP) .............................. 11-346272

(51) Int. Cl.⁷ .......................... B65H 75/48; B60R 22/34
(52) U.S. Cl. ................................... 242/382.2
(58) Field of Search ................. 242/382.3; 280/806; 297/478

(56) References Cited

U.S. PATENT DOCUMENTS

| | | | | |
|---|---|---|---|---|
| 4,749,143 A | * | 6/1988 | Tsukamoto et al. | 242/382.2 |
| 4,811,912 A | * | 3/1989 | Takada | 242/382.2 |
| 5,257,754 A | * | 11/1993 | Hishon | 242/382.2 |
| 5,495,993 A | * | 3/1996 | Hibata | 242/382.2 |
| 5,820,059 A | * | 10/1998 | Hibata et al. | 242/382.4 |
| 5,831,342 A | * | 11/1998 | Vivacqua et al. | 180/273 |
| 5,934,596 A | * | 8/1999 | Gorman et al. | 242/379.1 |
| 6,152,393 A | * | 11/2000 | Ando et al. | 242/382.2 |

FOREIGN PATENT DOCUMENTS

| | | |
|---|---|---|
| JP | 7-47239 | 11/1995 |
| JP | 10-244905 | 9/1998 |

* cited by examiner

*Primary Examiner*—Donald P. Walsh
*Assistant Examiner*—Joseph C Rodriguez
(74) *Attorney, Agent, or Firm*—Nixon Peabody LLP; Thomas W. Cole

(57) ABSTRACT

A webbing take-up device that can prevent unintended and unnecessary switching from an ELR mode to an ALR mode. In a webbing take-up device, a cam protrusion and a tongue portion are provided at a cam member that interlocks with a take-up shaft, and a breaking operational portion and an intermediate holding surface are provided at a disc control member. When a switch is made from the ELR mode to the ALR mode, unwinding and taking-up operations of the webbing are each preformed twice in succession so that the webbing take-up device is switched to the ALR mode, in which an ALR pawl engages with an outer-tooth ratchet wheel of a locking wheel. Accordingly, unless the aformentioned switching is carried out by conscious volition of a vehicle occupant, unintended and unnecessary switching from the ELR mode to the ALR mode does not occur.

2 Claims, 30 Drawing Sheets

WEBBING TAKE-UP DEVICE

BACKGROUND OF THE INVENTION

1. Technical Field of the Invention

The present invention relates to a webbing take-up device for use in a seat belt apparatus for protecting a vehicle occupant in the event of a vehicular emergency, in which an ELR mode and an ALR mode can be properly switched. In the ELR mode, an ELR prevents a take-up shaft from rotating in the direction in which the webbing is unwound, only in the event of a vehicular emergency. In the ALR mode, an ALR always prevents the webbing from being unwound, after a predetermined amount of the webbing has been unwound.

2. Description of the Related Art

In a webbing take-up device with which a vehicle is equipped, there is provided a locking mechanism for, when necessary, preventing the webbing from being unwound.

The locking mechanism comprises an ELR (i.e., Emergency Locking Retractor) and an ALR (i.e., Automatic Locking Retractor). Ordinarily, taking-up and unwinding (pulling-out) of the webbing is possible. In the event of a vehicular emergency, the ELR detects the state of emergency by an acceleration detection means and instantaneously prevents a take-up shaft from rotating in the direction in which the webbing is unwound. The ALR continually prevents further unwinding of the webbing after a predetermined amount of the webbing has been unwound.

In the ELR, a locking wheel is provided so as to follow the rotation of the take-up shaft in the direction in which the webbing is unwound, and an elastic body is inserted between the locking wheel and the take-up shaft. Therefore, in a normal state, the locking wheel and the take-up shaft integrally rotate. As a result, since it is possible to freely take up or unwind the webbing from the take-up shaft when the vehicle is in a state of normal travelling, a vehicle occupant can freely change his or her posture. In the event of vehicular emergency, an acceleration detection means prevents the locking wheel from rotating, and, due to the delayed rotation of the locking wheel relative to the take-up shaft, a locking member which rotates with the take-up shaft is guided and moved to mesh with ratchet teeth of a frame. As a result, the take-up shaft is prevented from rotating so that the webbing is stopped from unwinding.

On the other hand, in the ALR, an ALR pawl prevents the locking wheel from rotating due to unwinding of the webbing in a predetermined amount (therefore, in this state, the locking member which rotates together with the take-up shaft meshes with the ratchet teeth of the frame), and, thereafter, further unwinding of the webbing from the take-up shaft is not allowed so that the vehicle occupant can be securely restrained.

A webbing take-up device in which the ELR and the ALR are jointly provided has already been proposed by the same applicant of the present invention (for example, Japanese Patent Application Laid-Open (JP-A) No. 10-244905, Japanese Utility Model Application Publication (JP-Y) No. 7-47239, and the like).

In a webbing take-up device of this type, the ELR and ALR can be switched as needed. That is, when the webbing take-up device is between a state in which an entire amount of the webbing has been taken up by the take-up shaft and a state in which a predetermined amount of the webbing has been unwound, an ALR lever which is allowed to engage with the locking wheel by means of an urging force is compellingly disengaged from the locking wheel, and further engagement is prevented, and the locking member is controlled by the acceleration detecting means (that is, the ELR operative state). On the other hand, when the webbing take-up device is in a state in which a predetermined amount of the webbing has been unwound (for example, an entire amount of the webbing has been unwound), the ALR lever is compellingly engaged with the locking wheel so as to prevent further unwinding of the webbing (that is, the ALR operative state).

Accordingly, a single webbing take-up device is able to function as either the ELR or the ALR, according to the situation.

In a webbing take-up device of this type, there has been a drawback in that, in a state in which both taking up and unwinding of the webbing are possible (namely, in the ELR state), when a vehicle occupant to whom the webbing has been harnessed stoops or the like, the webbing take-up device may unintendedly and unnecessarily be switched to a state in which the webbing is prevented from unwinding (namely, the ALR state), which may make the vehicle occupant feel unpleasant.

In this case, it is possible to conceive of setting the overall length of the webbing to be much longer than the length required for ordinary use to harness the vehicle occupant, so that unnecessary switching from the ELR mode to the ALR mode may be prevented. However, simply setting the overall length of the webbing to be long may lead to increases in the size and cost of the device.

SUMMARY OF THE INVENTION

In view of the aforementioned, it is an object of the present invention to provide a webbing take-up device in which unintended and unnecessary switching from an ELR mode to an ALR mode can be prevented.

In accordance with a first aspect of the present invention, here is provided a webbing take-up device which operates in one of an ELR mode in which, in only a case of a vehicular emergency, a rotating of a take-up shaft of a webbing in a direction in which the webbing is unwound is prevented, and an ALR mode in which, after a predetermined amount of the webbing is unwound, an unwinding of the webbing is always prevented, wherein: a switching from the ELR mode to the ALR mode is carried out by, in the ELR mode, unwinding an entire amount of the webbing; taking up a predetermined amount of the webbing from a state in which the entire amount of the webbing is unwound; unwinding the entire amount of the webbing from a state in which the predetermined amount of the webbing is taken-up; and taking up the predetermined amount of the webbing from the state in which the entire amount of the webbing is unwound, in serial order; and a switching from the ALR mode to the ELR mode is obtained by, in the ALR mode, taking up a predetermined amount of the webbing.

In accordance with a second aspect of the present invention, there is provided a webbing take-up device comprising: a take-up shaft which takes up a webbing for restraining a vehicle occupant; a locking device which can engage with the take-up shaft to prevent the take-up shaft from rotating in a direction in which the webbing is unwound; a locking wheel which following rotates around the take-up shaft, and, when stops rotating, which guides the locking device such that the take-up shaft is prevented from rotating; an acceleration detecting means which detects a state of a vehicle emergency, and which stops the locking wheel from rotating; an ALR pawl which is able to move so as to switch between a state in which the ALR pawl engages with the locking wheel so as to prevent the locking wheel from rotating, and a state in which the ALR pawl is spaced from the locking wheel so as to allow the locking wheel to rotate; a reduction mechanism which operates due to an intermittent motion, comprising a driving gear which rotates integrally with the take-up shaft and a reduction gear which meshes with the driving gear; a disc control member which is provided with a braking operational portion which engages with the ALR pawl so as to keep the ALR pawl spaced from the locking wheel, and an intermediate holding surface which is disposed adjacent to the braking operational portion and which engages with the ALR pawl so as to keep the ALR pawl spaced from the locking wheel; and a cam member which is rotated by the reduction mechanism in an interlocking manner, and which is provided with a first pressing surface and a second pressing surface for pressing the disc control member, and which engages with the ALR pawl so as to keep the ALR pawl spaced from the locking wheel, wherein the webbing take-up device operates in one of an ELR mode or an ALR mode, the switching between the ELR mode or the ALR mode being carried out by the ALR pawl which is switched between a state in which the ALR pawl prevents the locking wheel from rotating, and a state in which the ALR pawl allows the locking wheel to rotate, wherein switching from the ELR mode to said ALR mode is carried out in a manner that: in the ELR mode, when an entire amount of the webbing, which is taken up by the take-up shaft, is unwound, the braking operational portion of the disc control member is disposed so as to keep the ALR pawl spaced from the locking wheel; and the disc control member and the cam member are disposed such that the first pressing surface of the cam member which is interlocked by the take-up shaft presses and rotates the disc control member, and that the ALR pawl is moved from the braking operational portion to be placed on the intermediate holding surface; when the entire amount of the webbing is unwound again after a predetermined amount of the webbing, the entire amount of which is unwound, is taken up, the disc control member and the cam member are disposed such that the second pressing surface of the cam member which is interlocked by with the take-up shaft presses and rotates the disc control member, and that the ALR pawl is moved from the intermediate holding surface to be placed on the cam member, and when the webbing, the entire amount of which is unwound, is taken up again, the ALR pawl engages with the locking wheel in such a manner in which the cam member which is interlocked by the take-up shaft rotates to be separated from the ALR pawl, and wherein a switching from the ALR mode to said ELR mode is carried out in a manner that: in said ALR mode, when a predetermined amount of the webbing is taken up, the braking operational portion keeps the ALR pawl spaced from the locking wheel in a manner that the cam member presses and rotates the disc control member.

In accordance with a third aspect of the present invention, there is provided a webbing take-up device comprising: a take-up shaft which takes up a webbing for restraining a vehicle occupant; a locking device which can engage with the take-up shaft to prevent the take-up shaft from rotating in a direction in which the webbing is unwound; a locking wheel which following rotates around the take-up shaft, and, when stops rotating, which guides the locking device such that the take-up shaft is prevented from rotating; an acceleration detecting means which detects a state of a vehicle emergency, and which stops the locking wheel from rotating; an ALR pawl which is able to move so as to switch between a state in which the ALR pawl engages with the locking wheel so as to prevent the locking wheel from rotating, and a state in which the ALR pawl is spaced from the locking wheel so as to allow the locking wheel to rotate, and which is integrally provided with a assistant arm; a switching holding member which holds the ALR pawl in one of a state in which the locking wheel is prevented from rotating, and a state in which the locking wheel is allowed to rotate; and a cam member which is rotated by the take-up shaft in a interlocking manner, and which is provided with a first protrusion, which engages with the ALR pawl to prevent the locking wheel from rotating, and a second protrusion, which engages with the ALR pawl to keep the ALR pawl spaced from the locking wheel, and in which a guide groove for guiding the assistant arm is formed, wherein the webbing take-up device operates in one of an ELR mode or an ALR mode, the switching between the ELR mode or the ALR mode thereof being carried out by the ALR pawl which is switched between a state in which the ALR pawl prevents the locking wheel from rotating, and a state in which the ALR pawl allows the locking wheel to rotate, wherein switching from the ELR mode to the ALR mode is carried out in a manner that: in the ELR mode, when an entire amount of the webbing, which is taken up by the take-up shaft, is unwound, the cam member is disposed in a manner in which the first protrusion of the cam member which is interlocked by the take-up shaft presses and rotates the ALR pawl so that the assistant arm of the ALR pawl abuts against the cam member and the ALR pawl is spaced from the locking wheel, when the entire amount of the webbing is unwound again after a predetermined amount of the webbing, the entire amount of which is unwound, is taken up, the cam member is disposed so as to allow the assistant arm to enter the guide groove of the cam member, and when the webbing, the entire amount of which is unwound, is taken up again, the cam member is disposed in a manner that the cam member which is interlocked by the take-up shaft rotates and the assistant arm enters the guide groove so that the ALR pawl rotates to engage with the locking wheel, and wherein a switching from the ALR mode to the ELR mode is carried out in a manner that: in the ALR mode, when a predetermined amount of the webbing is taken up, the second protrusion of the cam member which is rotated presses and rotates the ALR pawl to have the ALR pawl spaced from the locking wheel.

In accordance with a fourth aspect of the present invention, there is provided a webbing take-up device comprising: a take-up shaft which takes up a webbing for restraining a vehicle occupant; a locking device which can engage with the take-up shaft to prevent the take-up shaft from rotating in a direction in which the webbing is unwound; a locking wheel which following rotates around the take-up shaft, and, when stops rotating, which guides the locking device such that the take-up shaft is prevented from rotating; an acceleration detecting means which detects a state of a vehicle emergency, and which stops the locking wheel from rotating; an ALR pawl which is able to move so as to switch between a state in which the ALR pawl engages with the locking wheel so as to prevent the locking wheel from rotating, and a state in which the ALR pawl is spaced from the locking wheel so as to allow the locking wheel to rotate; a reduction mechanism which operates due to an intermittent motion, comprising a driving gear which rotates integrally with the take-up shaft and a reduction gear which meshes with the driving gear; a disc control member which is provided with a braking operational portion which engages with the ALR pawl so as to keep the ALR pawl spaced from the locking wheel, and which is provided with a guide pin; and a cam member which is rotated by the reduction mechanism in an interlocking manner, and which is provided with a guide groove which guides the guide pin which has entered therein and which is able to press the guide pin at least two predetermined end portions thereof, and which engages the ALR pawl so as to keep the ALR pawl spaced from the locking wheel, wherein the webbing take-up device operates in one of an ELR mode or an ALR mode, the switching between the ELR mode or the ALR mode being carried out by the ALR pawl which is switched between a state in which the ALR pawl prevents the locking wheel from rotating, and a state in which the ALR pawl allows the locking wheel to rotate, wherein switching from the ELR mode to the ALR mode is carried out in a manner that: in the ELR mode, when an entire amount of the webbing, which is taken up by the take-up shaft, is unwound, the braking operational portion of the disc control member is disposed so as to keep the ALR pawl spaced from the locking wheel; when the entire amount of the webbing is unwound again after a predetermined amount of the webbing, the entire amount of which is unwound, is taken up, the disc control member and the cam member are disposed such that an one predetermined end portion of the predetermined end portions of the guide groove of the cam member which is interlocked by the take-up shaft presses the guide pin to rotate the disc control member so that the ALR pawl is moved from the braking operational portion to be placed on the cam member, and when the webbing, the entire amount of which is unwound, is taken up again, the ALR pawl engages with the locking wheel in such a manner in which the cam member which is interlocked by the take-up shaft rotates to be separated from the ALR pawl, and wherein a switching from the ALR mode to the ELR mode is carried out in a manner that: in the ALR mode, when a predetermined amount of the webbing is taken up, an another predetermined end portion of the predetermined end portions of the guide groove of the cam member which is rotated presses the guide pin to rotate the disc control member so that the braking operational portion keeps the ALR pawl spaced from the locking wheel.

In accordance with a fifth aspect of the present invention, there is provided a webbing take-up device which operates in one of an ELR mode in which, in a case of a vehicular emergency, a rotating of a take-up shaft of a webbing in a direction in which the webbing is unwound is prevented, and an ALR mode in which, after a predetermined amount of the webbing is unwound, an unwinding of the webbing is prevented, wherein: a switching from the ELR mode to the ALR mode is carried out by, in the ELR mode, a combination action of unwinding an entire amount of the webbing and taking up a predetermined amount of the webbing from a state in which the entire amount of the webbing is unwound.

In accordance with a sixth aspect of the present invention according to the fifth aspect, wherein a switching from the ALR mode to the ELR mode is obtained by, in the ALR mode, taking up a predetermined amount of the webbing.

In the webbing take-up device according to the first aspect of the present invention, the switching from the ELR mode to the ALR mode is achieved by conducting the respective unwinding and taking-up operations of the webbing twice in sequential order. Accordingly, unless the aforementioned switching is carried out by the conscious volition of the vehicle occupant, an unintended and unnecessary switching from the ELR mode to the ALR mode which may make the vehicle occupant feel unpleasant does not happen.

Further, as a result, it is not necessary to set the overall length of the webbing to be much longer than the length ordinarily required to harness the vehicle occupant. Therefore, increases in size and cost can be avoided.

In the webbing take-up device according to the second aspect of the present invention, when the webbing take-up device is switched from the ELR mode to the ALR mode, by unwinding an entire amount of the webbing, the first pressing surface of the cam member presses and rotates the disc control so as to move the ALR pawl from the braking operational portion to be placed on the intermediate holding surface. Further, from this state in which the entire amount of the webbing has been unwound, by unwinding the entire amount of the webbing again after taking up a predetermined amount of the webbing, the second pressing surface of the cam member again presses and rotates the disc control so as to move the ALR pawl from the intermediate holding surface to be placed on the cam member. Then, from this state in which an entire amount of the webbing is unwound, by taking up the webbing again, the webbing take-up device is switched to the ALR mode where the cam member rotates to be disengaged from the ALR pawl and then the ALR pawl engages with the locking wheel to prevent the locking wheel from rotating.

In the webbing take-up device according to the second aspect of the present invention, the switching from the ELR mode to the ALR mode is achieved by conducting the respective unwinding and taking-up operations of the webbing twice in sequential order. Accordingly, unless the aforementioned switching is carried out by the conscious volition of the vehicle occupant, an unintended and unnecessary switching from the ELR mode to the ALR mode which may make the vehicle occupant feel unpleasant does not happen.

Further, as a result, it is not necessary to set the overall length of the webbing to be much longer than the length ordinarily required to harness the vehicle occupant. Therefore, increases in size and cost can be avoided.

In the webbing take-up device according to the third aspect of the present invention, when the webbing take-up device is to be switched from the ELR mode to the ALR mode, by unwinding an entire amount of the webbing, the first protrusion of the cam member presses and rotates the ALR pawl such that the assistant (auxiliary) arm of the ALR pawl abuts against the cam member, and that the ALR pawl is disengaged from the locking wheel. Further, from this state in which the entire amount of the webbing has been unwound, by taking up a predetermined amount of the webbing, the cam member is disposed at a position where the assistant arm is able to enter the guide groove of the cam member. Also, after that, by unwinding the entire amount of the webbing again, the cam member rotates so that the assistant arm enters the guide groove and the ALR pawl then rotates to engage with the locking wheel. As a result, the switching to the ALR mode is carried out.

In the webbing take-up device according to the third aspect of the present invention, the switching from the ELR mode to the ALR mode is achieved by conducting the respective unwinding and taking-up operations of the webbing twice in sequential order. Accordingly, unless the aforementioned switching is carried out by the conscious volition of the vehicle occupant, an unintended and unnecessary switching from the ELR mode to the ALR mode which may make the vehicle occupant feel unpleasant does not happen.

Further, as a result, it is not necessary to set the overall length of the webbing to be much longer than the length ordinarily required to harness the vehicle occupant. Therefore, increases in size and cost can be avoided.

In the webbing take-up device according to the fourth aspect of the present invention, when the webbing take-up device is switched from the ELR mode to the ALR mode, by unwinding an entire amount of the webbing again after taking up a predetermined amount of the webbing from the state in which the entire amount of the webbing is unwound, a one predetermined end portion of the guide groove of the cam member interlocking with the take-up shaft presses the guide pin to rotate the disc control. With this rotation of the disc control, the ALR pawl is moved from the braking operational portion to be placed on the cam member. Moreover, by taking up webbing again from this state in which the entire amount of the webbing has been unwound, the cam member rotates and disengages from the ALR pawl. As a result, the mode of the webbing take-up device is switched from the mode of use for ELR to ALR in which the ALR pawl engages with the locking wheel to prevent the same from rotating.

In the webbing take-up device according to the fourth aspect of the present invention, the switching from the ELR mode to the ALR mode is achieved by conducting the respective unwinding and taking-up operations of the webbing twice in sequential order. Accordingly, unless the aforementioned switching is carried out by the conscious volition of the vehicle occupant, an unintended and unnecessary switching from the ELR mode to the ALR mode which may make the vehicle occupant feel unpleasant does not happen.

Further, as a result, it is not necessary to set the overall length of the webbing to be much longer than the length ordinarily required to harness the vehicle occupant. Therefore, increases in size and cost can be avoided.

DESCRIPTION OF THE PREFERRED EMBODIMENTS

First Embodiment
(Overall Schematic Structure of Take-up Device)

Figure 1:
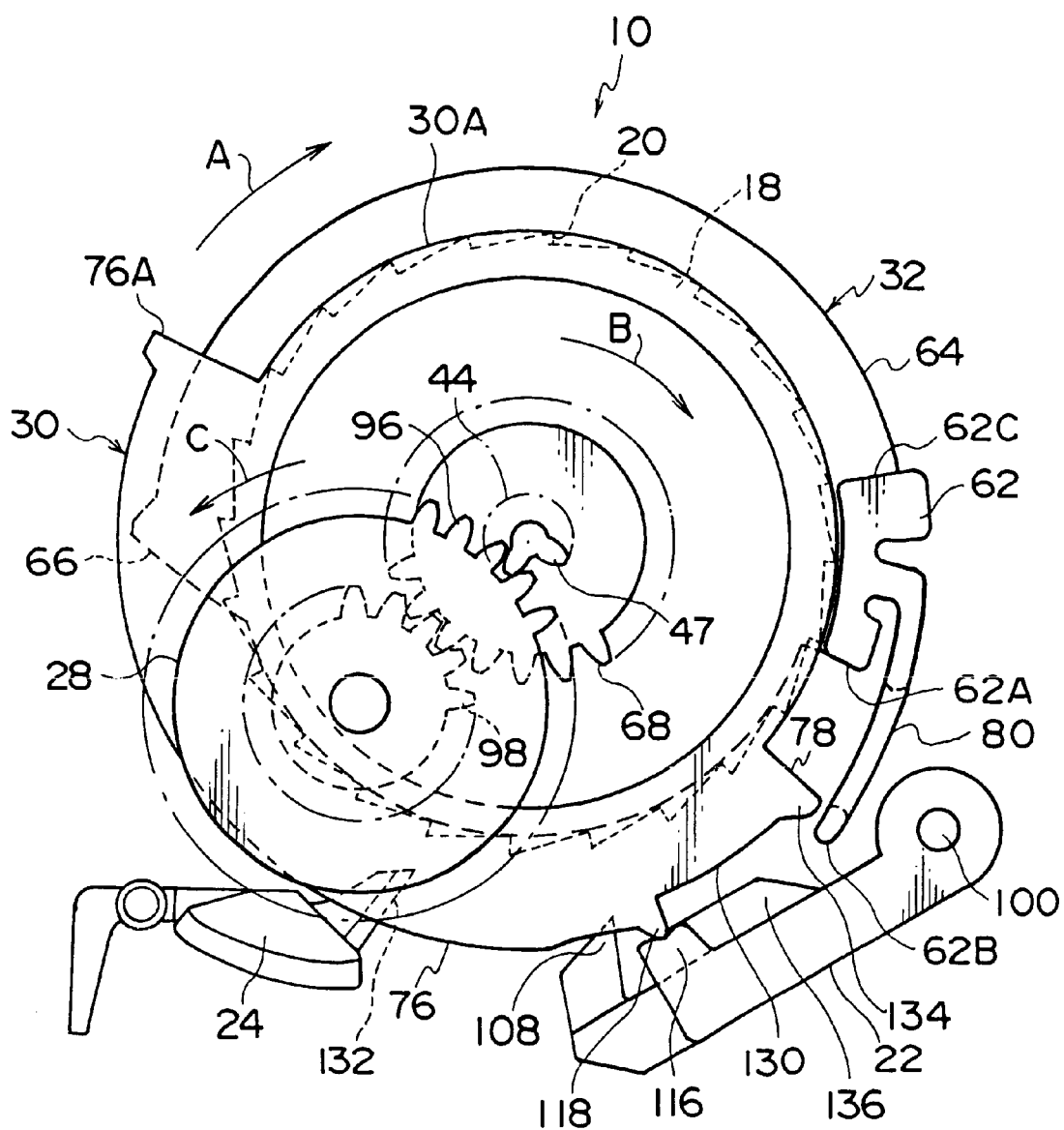
FIG. 1 is a front view of main portions of a structure of an ALR/ELR switching mechanism of a webbing take-up device relating to a first embodiment of the present invention.
Figure 2:
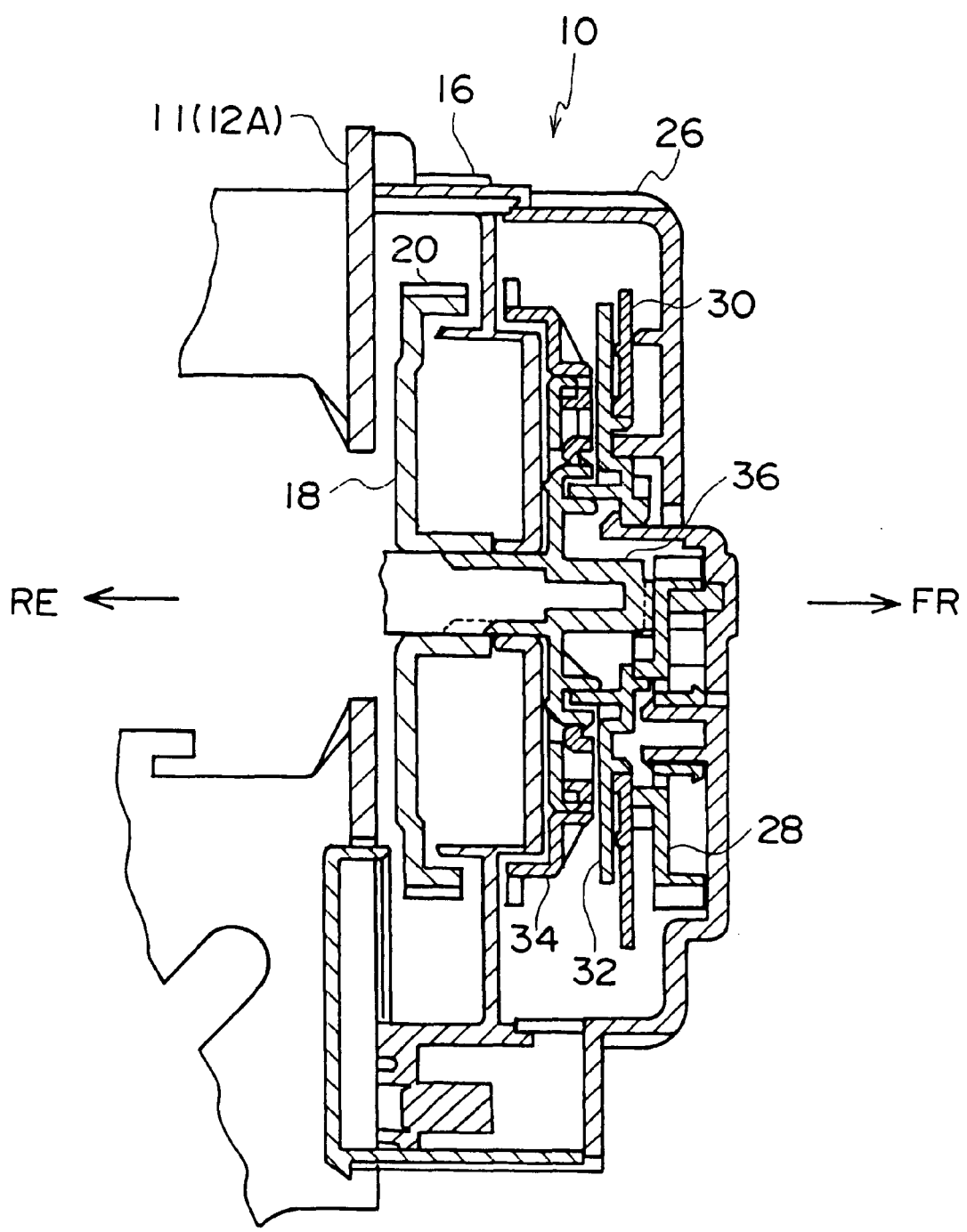
FIG. 2 is a cross-sectional view that illustrates the main portions of the structure of the ALR/ELR switching mechanism of the webbing take-up device relating to the first embodiment of the present invention.
Figure 3:
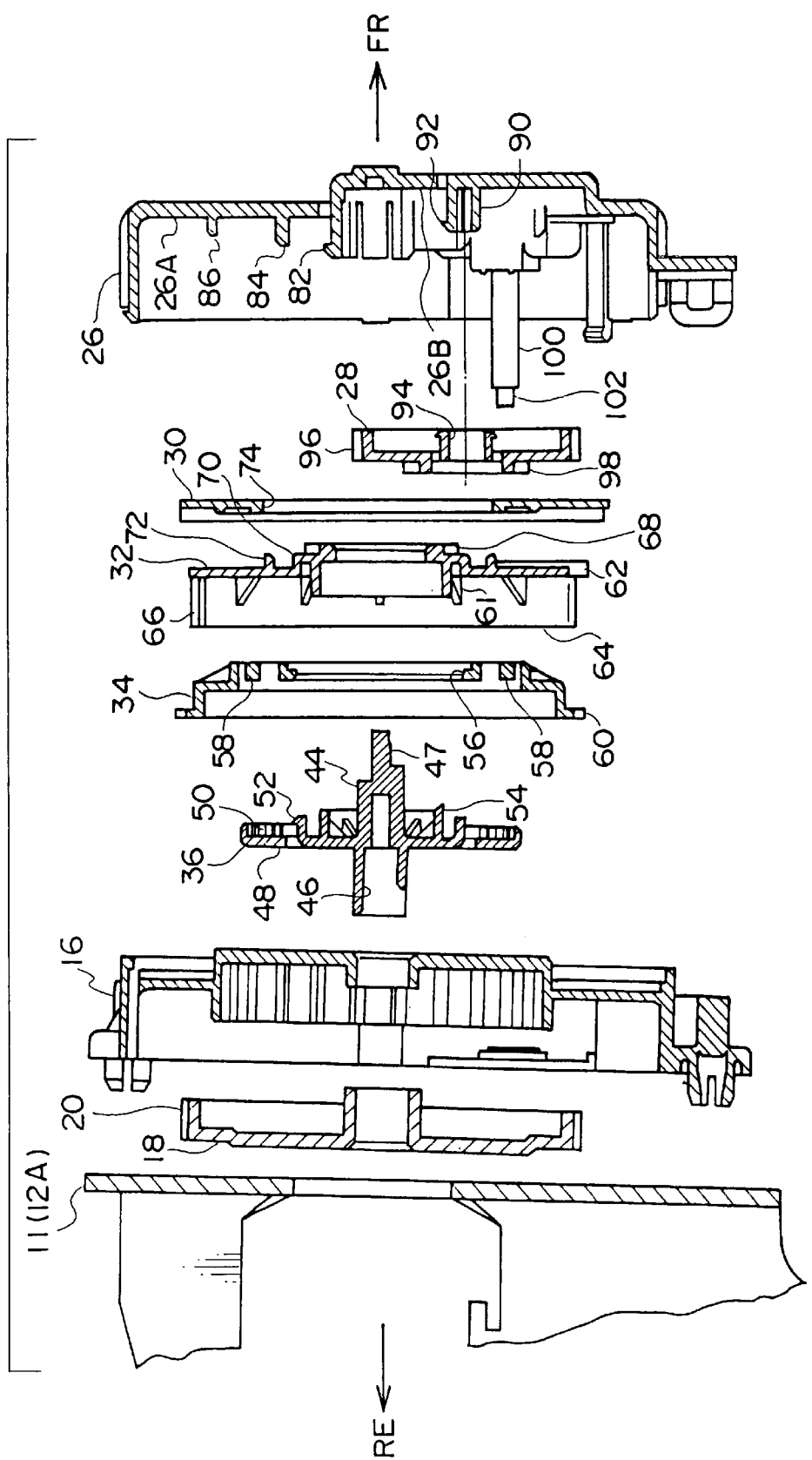
FIG. 3 is an exploded cross-sectional view corresponding to FIG. 2 that illustrates the main portions of the structure of the ALR/ELR switching mechanism of the webbing take-up device relating to the first embodiment of the present invention.

FIGS. 2 and 3 each show a cross-sectional view illustrating a structure of main portions of a webbing take-up device 10 relating to a first embodiment of the present invention. FIGS. 4 through 8 each show a perspective view illustrating the structure of the main portions of the webbing take-up device 10.

Figure 8:
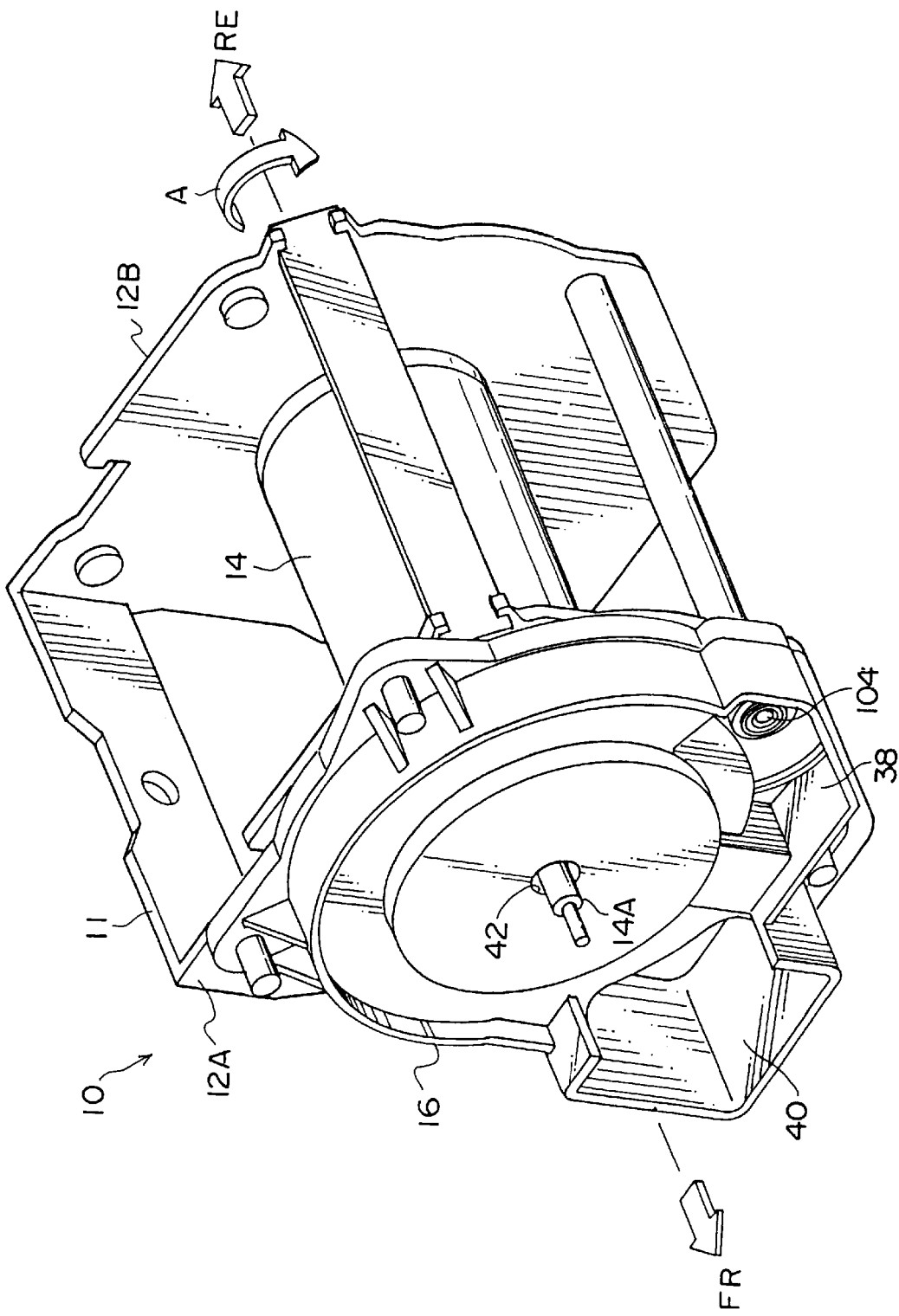
FIG. 8 is a perspective view of a structure of a main body of the webbing take-up device relating to the first embodiment of the present invention.

As shown in FIG. 8, in the webbing take-up device 10, a body frame 11 is fixed to a vehicle body by unillustrated mounting bolts. The body frame 11 has a pair of leg portions 12A and 12B which extend from both sides of the body frame and which are parallel to each other. A sensor cover 16 is mounted to the leg portion 12A.

A take-up shaft 14 is rotatably supported between these leg portions 12A and 12B. An unillustrated through hole that passes through the take-up shaft 14 in the radial direction thereof is formed at a central portion of the take-up shaft 14. One end of a webbing (illustration thereof is omitted) for restraining a vehicle occupant is engaged with this through hole. The direction in which the take-up shaft 14 rotates due to unwinding of the webbing is indicated by arrow A.

One end portion of an unillustrated coil spring is engaged with a rear end portion (i.e., the end portion in the direction of arrow RE in FIG. 8) of the take-up shaft 14. Because the coil spring always urges the take-up shaft 14 in the direction in which the webbing is taken up (the direction opposite to the direction of arrow A), the webbing is generally taken up in the direction opposite to the direction of arrow A. A vehicle occupant can harness the webbing by engaging a tang plate, which is provided to an end portion of the webbing (not shown), with a buckle device mounted to the vehicle body.

(Structure of Locking Device)

A conventionally used locking device is mounted at one portion of the take-up shaft 14. As shown in FIGS. 2 and 3, a locking wheel 18 is mounted on the take-up shaft 14. An externally toothed ratchet wheel 20 is formed at an outer circumference of the locking wheel 18. An ALR pawl 22 with which the locking device stops unwinding of the webbing and which will be described later, and a sensor pawl 24 of an acceleration sensor device 120 can engage with and disengage from the externally toothed ratchet wheel 20. When the rotation of the locking wheel 18 is prevented by one of these pawls, the locking wheel 18 rotates relatively with the take-up shaft 14. (Namely, the locking wheel 18 and the take-up shaft 14 do not rotate integrally in this case.)

In this locking device, when the webbing is unwound in the unwinding direction thereof, the take-up shaft 14 starts to rotate and the locking wheel 18, which followingly rotates around the take-up shaft 14 via an urging means such as a spring, is thereby about to rotate. However, when the ALR pawl 22 (described later) engages with the externally toothed ratchet wheel 20, or when the sensor pawl 24 engages with the externally toothed ratchet wheel 20 due to a large acceleration of the vehicle, rotation of the locking wheel 18 is prevented and the take-up shaft 14 solely rotates by a small amount relative to the stopped locking wheel 18. Then, due to the relative rotation between the locking wheel 18 and the take-up shaft 14, a pawl portion of a lock plate (illustration thereof is omitted), which is formed at the take-up shaft 14 side, meshes with an internally toothed ratchet wheel (illustration thereof is omitted) formed integrally with the leg portion 12A. As a result, the rotation of the take-up shaft 14 in the unwinding direction thereof is stopped, and further unwinding of the webbing is thereby prevented.

(Overall Configuration of ALR/ELR Switching Mechanism)

In the webbing take-up device 10, an ALR/ELR switching mechanism is mounted at a side of the take-up shaft 14 extending from the leg portion 12A of the frame 11 and at an outer portion relative to the locking wheel 18. The ALR/ELR switching mechanism comprises a holder 28 disposed between a sensor cover 16 and a sensor plate 26, a disc control 30, a cam member 32, a ratchet member 34, a rotor 36, and an ALR pawl 22. Further, an acceleration sensor device 120 is disposed between the sensor cover 16 and the sensor plate 26.

(Schematic Structure of Sensor Cover)

As shown in FIGS. 2, 3 and 8, the sensor cover 16 is fixed at an outwardly facing surface of the leg portion 12A so as to cover the locking device having the locking wheel 18, and is formed in a circular cover shape with an extended axial portion 14A of the take-up shaft 14 which extends from the leg portion 12A as a center. As shown in FIG. 8, an ALR accommodating portion 38 for accommodating the ALR pawl 22 and a housing portion 40 for housing the acceleration sensor device 120 are formed integrally with the sensor cover 16 at two predetermined portions thereof. A penetrating hole 42 is provided at the center of the circular, cover-shaped portion of the sensor cover 16, and the extended axial portion 14A of the take-up shaft 14 projects from the penetrating hole 42.

(Structure of Rotor)

Figure 4:
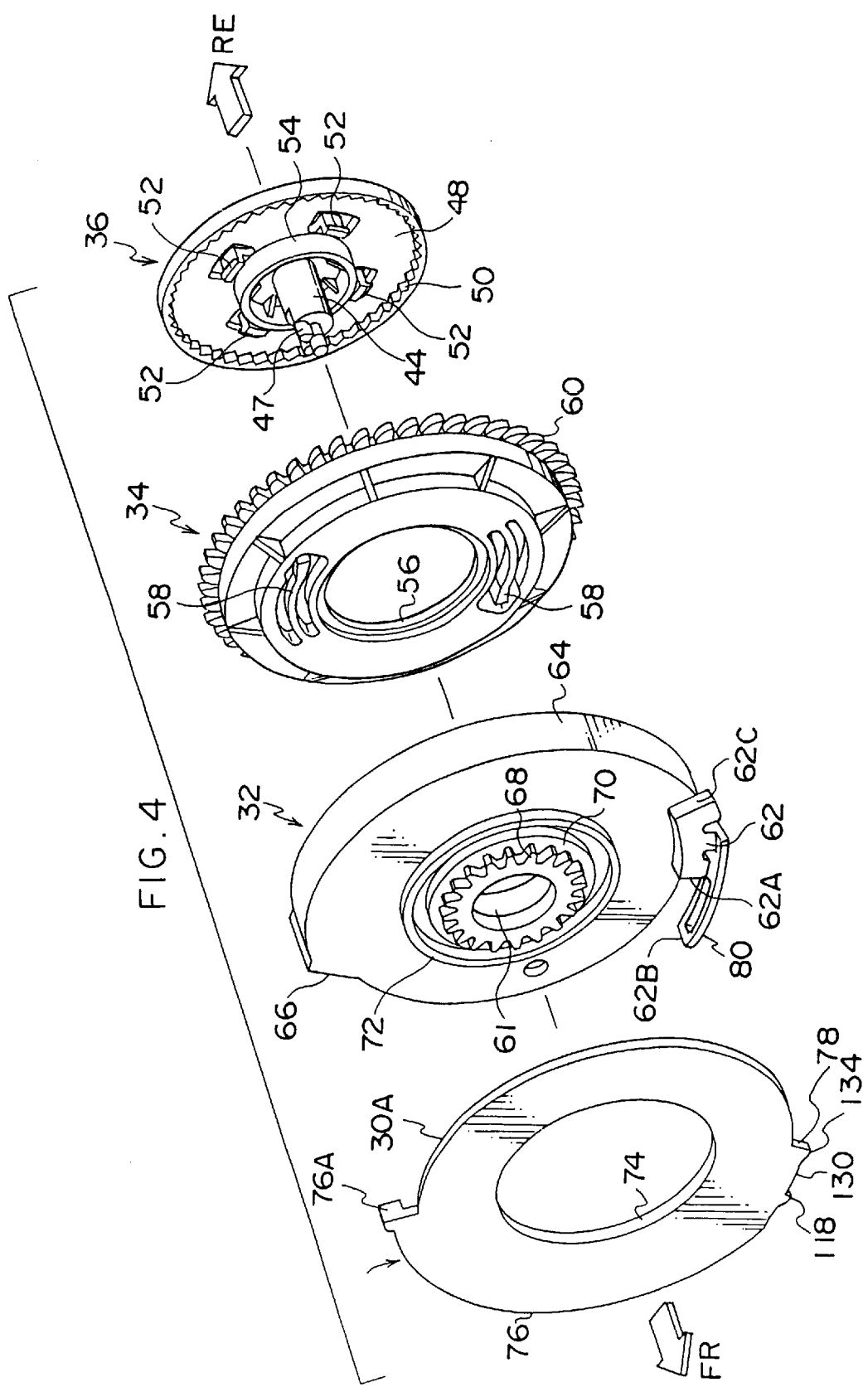
FIG. 4 is an exploded perspective view that illustrates main structural components of the ALR/ELR switching mechanism of the webbing take-up device relating to the first embodiment of the present invention.
Figure 5:
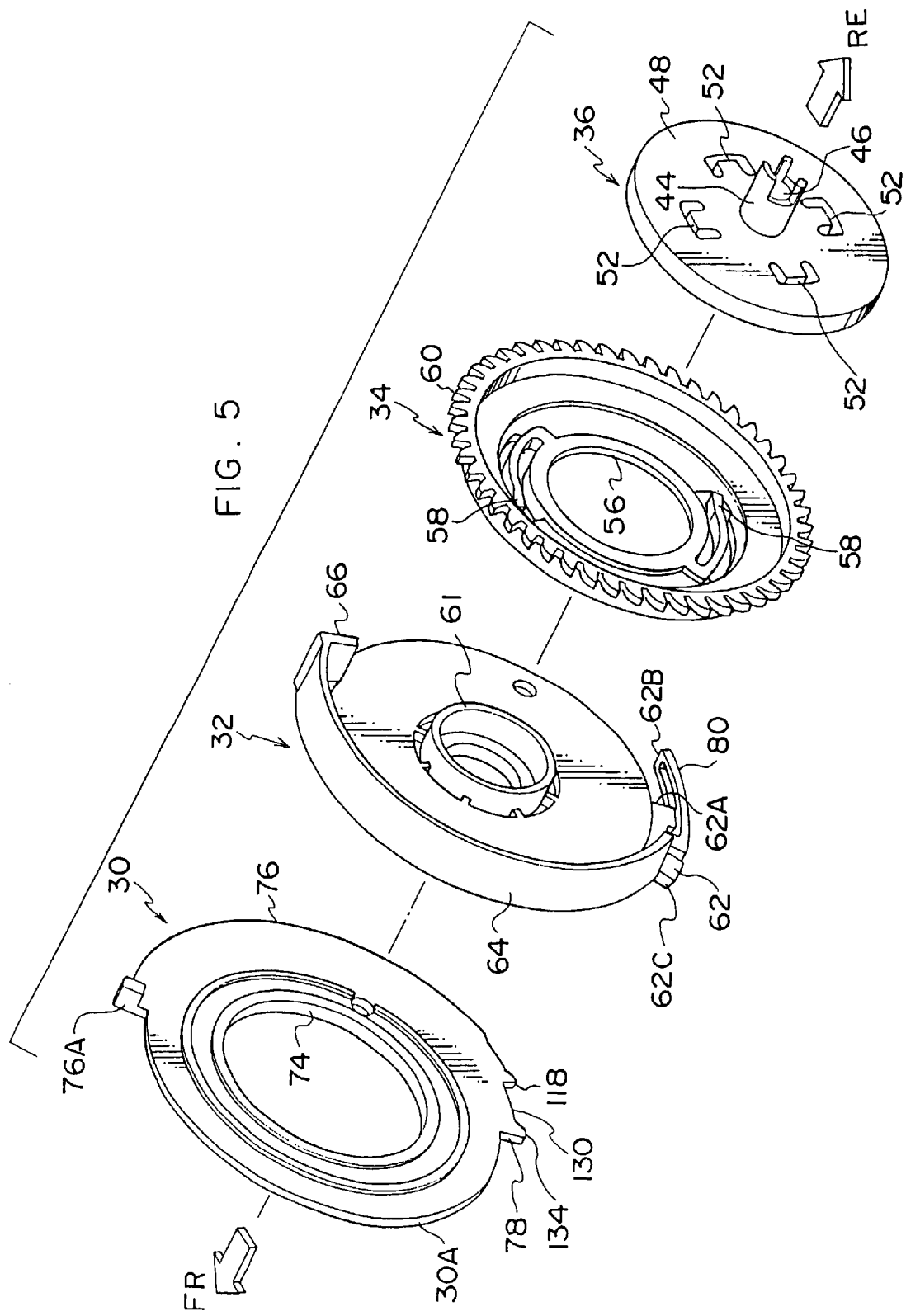
FIG. 5 is an exploded perspective view corresponding to FIG. 4 that illustrates the main structural components of the ALR/ELR switching mechanism of the webbing take-up device relating to the first embodiment of the present invention.

A rotor 36 is attached to the extended axial portion 14A of the take-up shaft 14. As shown in FIGS. 4 and 5, the rotor 36 has a cylindrical-shaped axial portion 44. The rotor 36 is fixed to the extended axial portion 14A in a manner in which the extended axial portion 14A of the take-up shaft 14 is fitted into a hole portion 46 which is formed at a rear end portion of the axial portion 44 in the axial direction thereof and opens at the rear end portion side. As a result, the rotor 36 can rotate integrally with the extended axial portion 14A.

A driving gear 47 which is formed as an intermittent gear in which two teeth are successively provided is disposed at the front (the direction indicated by arrow FR) end portion of the axial portion 44 of the rotor 36. A disc-shaped support plate 48 is also provided at an intermediate portion of the axial portion 44 of the rotor 36. An internally toothed ratchet teeth portion 50 is formed at the front side of the support plate 48 in a manner in which it stands upright from the side surface thereof Furthermore, substantially L-shaped tongue-like elastic support bodies 52 are formed integrally with the support plate 48 in a manner in which a plurality (four in the present embodiment) of substantially U-shaped slots (see FIG. 5) are formed on the support plate 48 at an inner circumference thereof, and disposed at substantially equal intervals around the axial portion 44. The tip portion of each of elastic supporting bodies 52 is bent in a hook-shape. A cylindrical shaft cylinder 54 is formed between the elastic support bodies 52 and the axial portion 44 on the support plate 48 coaxially and integrally with the support plate 48.
(Structure of Ratchet Member)

Figure 7:
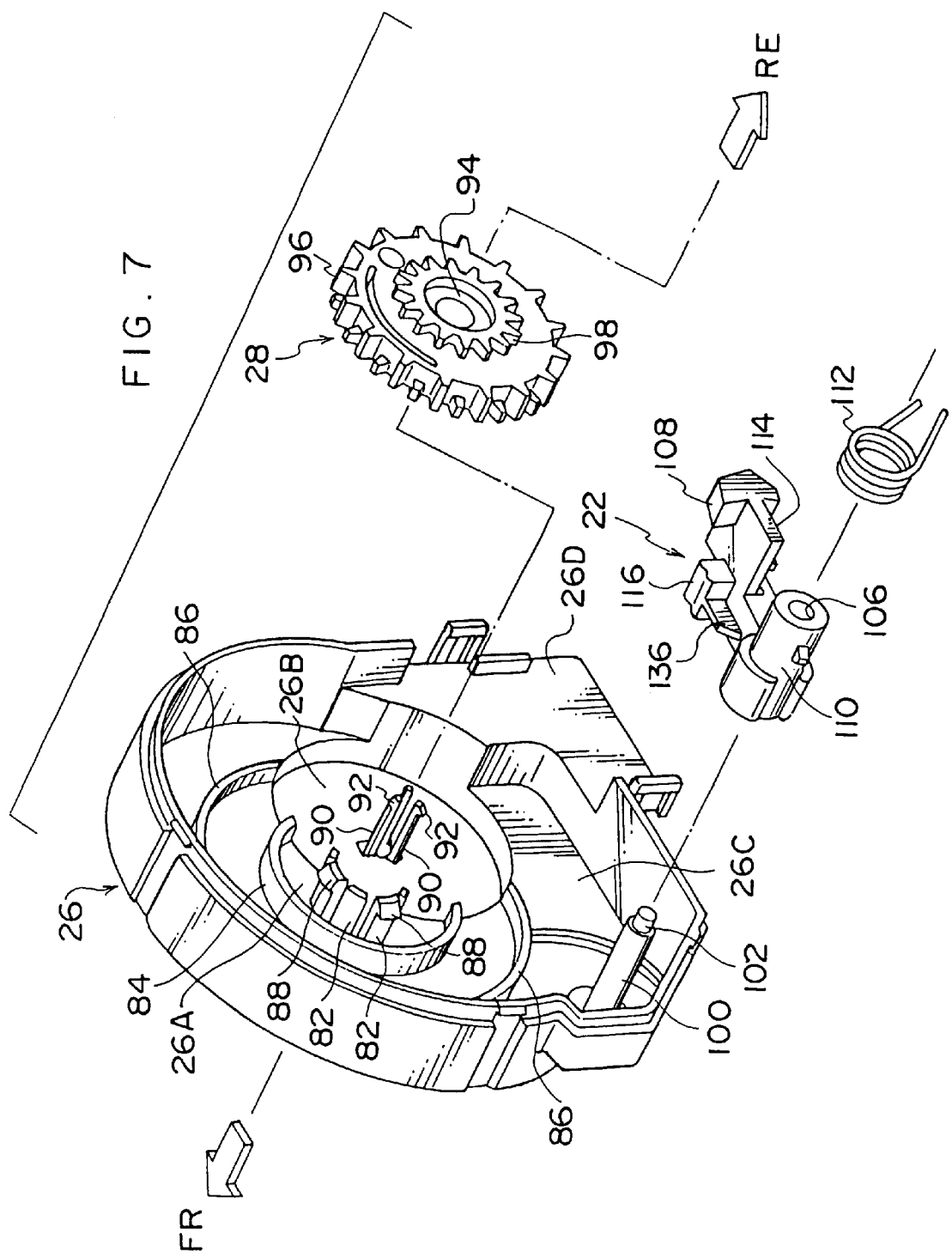
FIG. 7 is an exploded perspective view corresponding to FIG. 6 that illustrates the main structural components of the ALR/ELR switching mechanism of the webbing take-up device relating to the first embodiment of the present invention.

A ratchet member 34 is mounted on the rotor 36 so as to be rotatable in one predetermined direction (the direction in which the webbing is unwound). The ratchet member 34 has a toric shape, and a circular central opening thereof serves as a supporting and receiving circumferential portion 56 by which the elastic support bodies 52 are rotatably received and supported. As shown in FIGS. 4 and 7, cantilever engaging pieces 58 are formed at two predetermined areas on a side surface of the ratchet member 34. The cantilever engaging pieces 58 are formed by substantially U-shaped or inverted U-shaped surface portions of the ratchet member 34 being cut out, so that the resultant engaging pieces 58 have an elongated, tongue-like configuration that curves along the circumferential direction. When the supporting and receiving circumferential portion 56 of the ratchet portion 34 is supported and received by the elastic supporting bodies 52 of the rotor 36, tip salient portion of each engaging piece 58 of the ratchet member 34 elastically presses and makes contacts with the internally toothed ratchet teeth portion 50. Thus, when the ratchet member 34 is about to rotate relative to the rotor 36 in the direction in which the webbing is unwound, the engaging pieces 58 slide on the internally toothed ratchet teeth portion 50 to be elastically distorted so that the ratchet member 34 freely rotates. On the other hand, when the ratchet member 34 is about to rotate relative to the rotor 36 in the direction in which the webbing is taken up, the engaging pieces 58 mesh with the internally toothed ratchet teeth portion 50 so as to prevent the ratchet member from rotating.

A ratchet teeth portion 60 is formed at an outer circumference of the ratchet member 34 which facilitates the release operation of the sensor pawl 24 having engaged with the externally toothed ratchet wheel of the locking wheel 18.
(Structure of Cam Member)

A cam member 32 is mounted to the rotor 36 to which the ratchet member 34 has been attached as described above. As shown in FIGS. 4 and 5, generally the cam member 32 is substantially disc-shaped. A shaft cylinder portion 61 is integrally provided toward the rotor 36 side at the center of the cam member 32. The shaft cylinder portion 61 is rotatably supported such that the shaft cylinder 54 of the rotor 36 is slidably fitted into the shaft cylinder hole thereof, whereby the rotor 36 and the cam member 32 are able to rotate relative to each other.

A cam protrusion 62 and a braking portion 64 are formed integrally with the cam member 32 at the outer circumference thereof. The cam protrusion 62 has a substantially trapezoidal plate shape, and one portion thereof extrudes from the outer circumferential portion of the cam member 32. Further, the cam protrusion 62 is formed integrally with the cam member 32 so as to project from the side surface of the cam member 32 at the disc control 30 side (the direction of arrow FR). Further, the side portions of the cam protrusion 62 are formed as a first pressing surface 62A and a third pressing surface 62C for striking against one portion of the disc control 30 (described later) to interlock with the same. A tongue portion 80 is formed integrally with the cam protrusion 62 and extends toward the first pressing surface 62A side. The tongue portion 80 has a predetermined elasticity and the tip thereof is a second pressing surface 62B for striking against one portion of the disc control 30 to interlock with the same.

Meanwhile, the braking portion 64 is formed, similar to the cam protrusion 62, on the outer circumference of the cam member 32 at a position having a larger diameter than the cam member 32, and is formed as a rib extending over a predetermined central angle from the cam protrusion 62. A guide surface portion 66 which inclines toward the direction in which the cam member 32 is connected is formed at the end portion opposite to the cam member 62 of the braking portion 64. The guide surface portion 66 inclines towards the center of the cam member 32 over the tip portion thereof.

A toric seat 70 is formed around the penetration hole of the shaft cylinder portion 61 so as to project from the side surface of the cam member facing the disc control 30. An externally toothed cam rotating gear 68 is formed integrally with the seat 70 so as to project from the same. Furthermore, a ring-shaped rotational supporting and receiving portion 72, the cross-section thereof being rectangular, is formed integrally with the cam member 32 around the cam rotating gear 68 and the seat 70.
(Structure of Disc Control)

A disc control 30 is rotatably supported and received at the rotational supporting and receiving portion 72 of the cam member 32. The disc control is formed in an annular shape with a round-axis opening 74 provided at the central portion of the circular plate thereof. The disc control 30 is mounted to the cam member 32 in a state in which the rotational supporting and receiving portion 72 of the cam member 32 is inserted into the round-axis opening 74. The cam member 32 and the disc control 30 are able to rotate relative to each other such that the disc control 30 is slidingly guided on the side surface of the cam member 32.

A braking operational portion 76 for the ALR pawl 22 is integrally formed at an outer circumference of the disc control 30. The portion on the circumference of the disc control 30 where the braking operational portion 76 is not formed is a smaller diameter portion 30A. The braking operational portion 76 is formed in a circular arc shape by an extension of the disc control 30 in the radial direction thereof over a predetermined central angle. The braking operational portion 76 functions to engage with the ALR pawl 22 to have the same kept disengaged from the locking wheel 18.

As shown in FIGS. 4 and 5, an abutting end portion 76A, which is one end portion of the braking operational portion 76, is formed in an L-shape so as to abut the third pressing surface 62C of the cam protrusion 62.

Meanwhile, a convex portion 118 protruding in the radial direction is formed at the other end portion of the braking operational portion 76. An intermediate holding surface 130 is formed adjacent to the other end portion of the braking operational portion 76 (in close proximity to the convex portion 118). The intermediate holding surface 130 has a smaller diameter than the braking operational portion 76. Similar to the braking operational portion 76, the intermediate holding surface 130 also functions to engage with the ALR pawl 22 to have the same temporally kept disengaged from the locking wheel 18.

An end portion of the intermediate holding surface 130 is a pressure-receiving surface 78 which abuts the first pressing surface 62A of the cam protrusion 62 formed at the cam member 32. A convex portion 134 which protrudes in the radial direction of the intermediate holding surface 130 is provided at an end portion of the intermediate holding surface 130 (tip portion of the pressure-receiving surface 78).

When the disc control 30 structured as described above is in a state of being mounted to the cam member 32, the disc control 30 is able to rotate relatively with respect to the cam member 32 until an abutting end portion 76A of the disc control 30 is blocked by striking against the third pressing surface 62C of the cam protrusion 62, or until the pressure-receiving surface 78 is blocked by striking against the first pressing surface 62A of the cam protrusion 62.

(Structure of Inner Side Portion of Sensor Cover)

Figure 6:
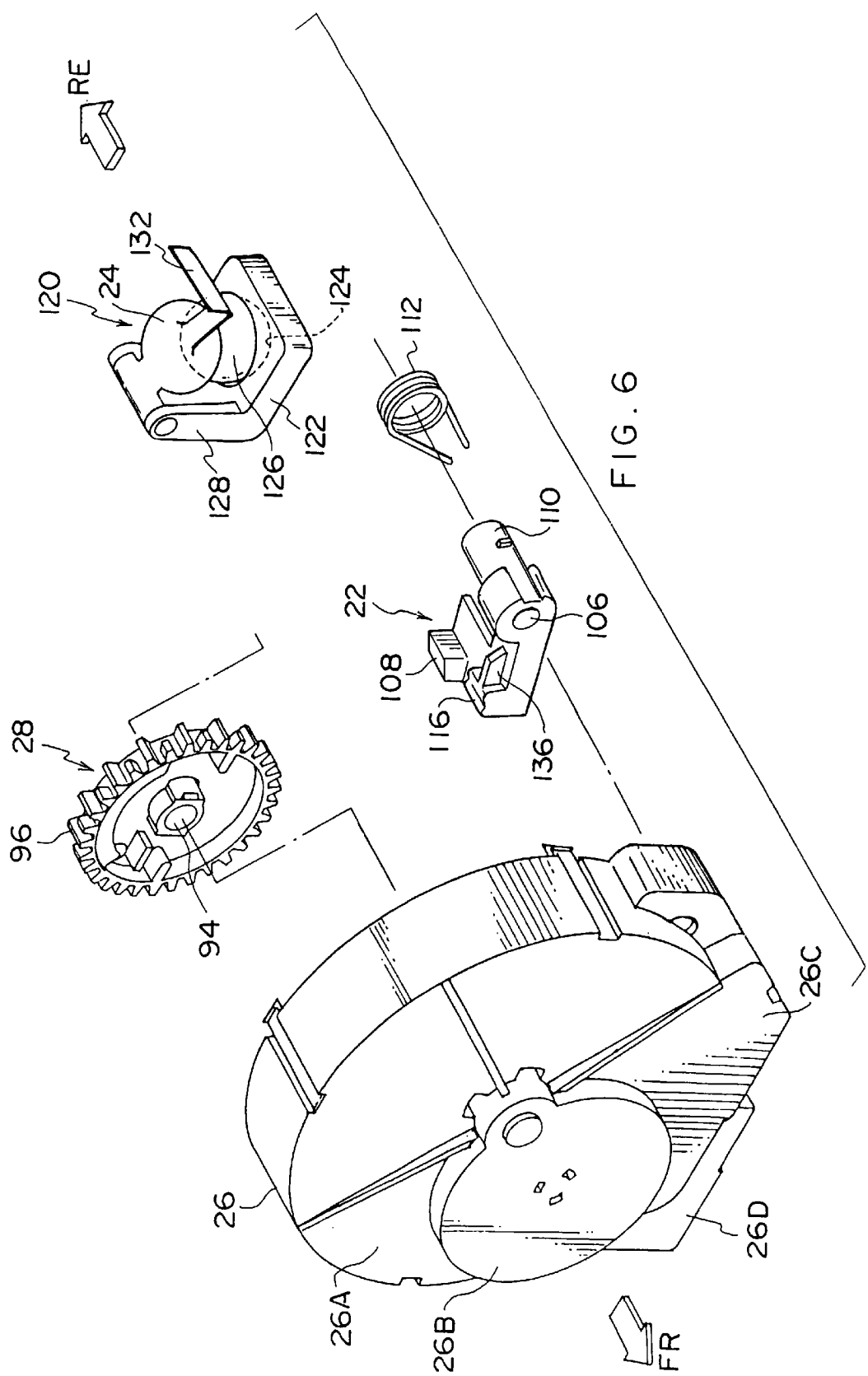
FIG. 6 is an exploded perspective view that illustrates the main structural components of the ALR/ELR switching mechanism of the webbing take-up device relating to the first embodiment of the present invention.

As shown in FIGS. 6 and 7, the sensor plate 26, which is assembled to the sensor cover 16 to form a housing, integrally comprises a substantially circular main casing portion 26A for accommodating the disc control 30, the cam member 32, the ratchet member 34 and the rotor 36; a holder casing portion 26B formed in a substantially small circle at an eccentric portion of the main casing portion 26A for covering a holder 28; an ALR pawl covering portion 26C for mounting and covering the ALR pawl 22; and an acceleration sensor covering portion 26D for covering the acceleration sensor device 120.

An engaging pawl portion 82 for receiving the cam member 32, and large and small slide-contact guide ribs 84 and 86 are provided at an inside central portion of the main casing portion 26A. The engaging pawl portion 82 is formed by a plurality of small protruding pieces arranged in a substantially semicircular manner. At the tip portions of two of the protruding pieces, there are formed warped pawl portions 88 which have a substantially triangular shape at the side surfaces thereof. The warped pawl portions 88 serve as stoppers by engaging with a circular opening 68A from a backside thereof (i.e., the ratchet member 34 side). The circular opening 68A extends through the hole of the shaft cylinder portion 61 which opens at a central portion of a cam rotating gear 68 of the cam member 32.

The small slide-contact guide rib 84 provided at the inside surface of the main casing portion 26A is formed in a substantially semicircular shape around the engaging pawl portion 82 and restricts the amount in which the cam member 32 moves in the axial direction by slidingly contacting the side surface of the cam member 32 in an assembled state shown in FIG. 2.

The large slide-contact guide rib 86 provided at the inside surface of the main casing portion 26A is disposed in semicircular shape around the small slide-contact guide rib 84. The large slide-contact guide rib 86 has a larger diameter and a smaller height than the small slide-contact guide rib 84 and restricts the amount in which the disc control 30 moves in the axial direction by slidingly contacting the side surface of the disc control 30 in an assembled state shown in FIG. 2.

The small circular holder casing portion 26B of the sensor plate 26 is formed so as to project outwardly (in the direction opposite to the sensor cover 16 side, i.e., the direction of arrow FR) from the main casing portion 26A. At a central position of the holder casing portion 26B, there are provided supporting and receiving members 90 protruding inwardly (i.e., the sensor cover 16 side) therefrom. The supporting and receiving members 90 are formed such that three square pillars are disposed at substantially equal intervals around the central portion of the holder casing portion 26B so as to provide rotational supporting and receiving axes. At each of the tip portions of the supporting and receiving members 90, there is provided a pawl portion 92 which has a substantially triangular side surface and projects in the outer peripheral direction.

Further, the ALR pawl covering portion 26C of the sensor plate 26 is formed at an underside of and near one side portion of the main casing portion 26A when viewing the respective Figures. One portion of the ALR pawl covering portion 26C is provided with a round bar-shaped shaft pin 100. A small cylindrical fitting protruding portion 102 is integrally formed at a tip of the shaft pin 100. The fitting protruding portion 102 is fitted, during assembly, with a fitting hole 104 provided at a corresponding region of the sensor cover 16 shown in FIG. 8.

The acceleration sensor covering portion 26D of the sensor plate 26 is disposed at an underside of the main casing portion 26A when viewing the respective Figures and at a side opposite to the ALR pawl covering portion 26C. The acceleration sensor covering portion 26D forms an accommodating portion for the acceleration sensor device 120 when the sensor plate 26 is assembled to the sensor cover 16.

(Structure of Holder)

As shown in FIGS. 6 and 7, a holder 28 is rotatably supported and received by the supporting and receiving member 90 formed at the holder casing portion 26B of the sensor plate 26. A cylindrical shaft hole 94 for forming a shaft hole is provided integrally with the holder 28 at a central portion thereof. As shown in FIG. 2, the holder 28 is rotatably supported relative to the sensor plate 26 in a manner that the supporting and receiving member 90 is inserted through the shaft hole portion 94 and the pawl portion 92 thereof is engaged with a counterbore portion facing the disc control 30 side of the shaft hole portion 94.

A reduction gear 96 that meshes with the driving gear 47 of the rotor 36 is provided at an outer circumference of the holder 28. The reduction gear 96 is a peripheral gear for an intermittent gear mechanism and structured such that the tooth width of every other tooth is half that of each intervening tooth. Further, an interlocking gear portion 98, which is a ring-shaped externally toothed gear surrounding the shaft hole portion 94, is provided at a planar portion of the disc control 30 side (i.e., arrow RE side) of the holder 28. The interlocking gear portion 98 meshes with the cam rotating gear 68 of the cam member 32 in an assembled state shown in FIG. 2.

(Structure of ALR Pawl)

As shown in FIGS. 6 and 7, an ALR pawl 22 is supported by the shaft pin 100 provided at the ALR pawl covering portion 26C of the sensor plate 26. A cylindrical shaft portion 110 is provided at a base end of the ALR pawl 22 and a shaft hole 106, which is a round-shaped penetrating hole, is formed at the shaft portion 110 such that it corresponds to the shaft pin 100. The ALR pawl 22 is rotatably supported in the ALR pawl covering portion 26C by inserting the shaft pin 100 into the shaft hole 106.

A pawl portion 108 that engages with the externally toothed ratchet wheel 20 of the locking wheel 18 is integrally provided at a tip of the ALR pawl 22. A rectangular notch 114 is provided between the bearing portion 110 and the pawl portion 108 of the ALR pawl 22. A twisted coil spring 112 is mounted to the bearing portion 110 by inserting the coil portion thereof over the outer circumference of the bearing portion 110. Due to the urging force from the twisted coil spring 112, the ALR pawl 22 is urged in the direction in which the pawl portion 108 thereof is urged with the externally toothed ratchet wheel 20 of the locking wheel 18.

A small driven platform 116 is integrally provided at the side opposite to the side on which the notch 114 of the ALR pawl 22 is formed. A rib-shaped tongue introducing portion 136 is formed continuous with the driven platform 116. The driven platform 116 lifts the ALR pawl 22 by engaging with the braking operational portion 76 or the intermediate holding surface 130 of the disc control 30 to move the pawl portion 108 in the direction apart from the externally toothed ratchet wheel 20 of the locking wheel 18. The tongue introducing portion 136 corresponds to the tongue portion 80 of the cam protrusion 62, and, in a state in which the driven platform 116 engages with the braking operational portion 76 of the disc control 30, when the cam member 32 rotates and moves, it guides the tongue portion 80 toward the intermediate holding surface 130 side.

(Structure of Acceleration Sensor Device)

An acceleration sensor device 120 is accommodated within the acceleration sensor covering portion 26D of the sensor plate 26. A conventionally used acceleration sensor device can be applied to the acceleration sensor device 120. In the acceleration sensor device 120, as shown in FIG. 6, a metallic spherical body 126 is placed in a dish-shaped concave portion 124 which is a part of a large spherical surface disposed in a pedestal 122 fixed to the sensor plate 26. A sensor pawl 24 which is supported and received by a strut 128 of the pedestal portion 122 is placed on the spherical body 126. When a vehicle acceleration greater than or equal to a predetermined value is applied to the spherical body 126 and the spherical body moves upward in the concave portion 124, the sensor pawl 24 is moved to engage the pawl portion 132 thereof with the externally toothed ratchet wheel 20 of the locking wheel 18.

(Reduction Gear Mechanism for Cam Member)

Figure 9:
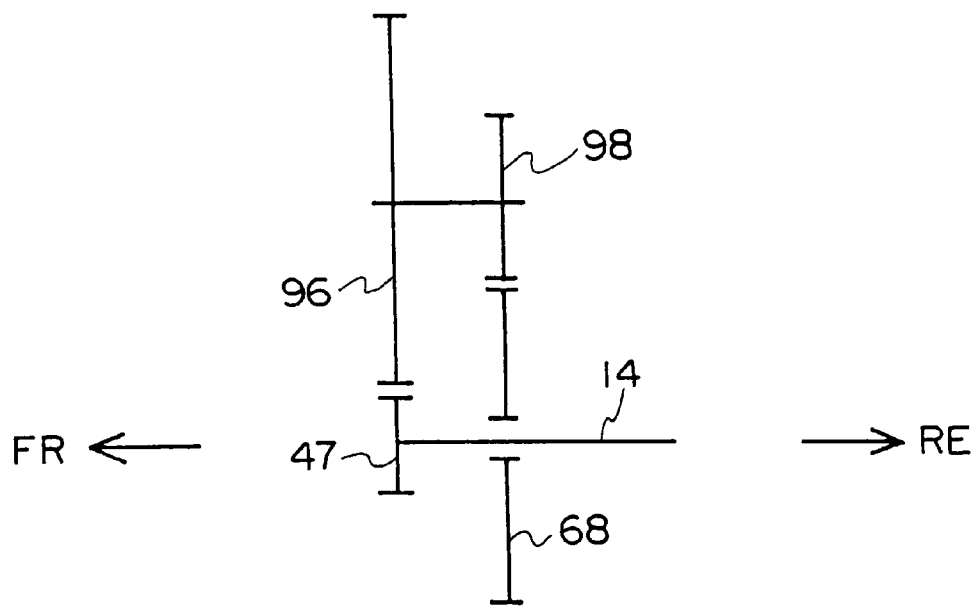
FIG. 9 is a schematic, explanatory view that illustrates a structure of a gear transmission mechanism of the webbing take-up device relating to the first embodiment of the present invention.

Next, a reduction gear mechanism used for the ALR/ELR switching mechanism will be explained in detail with reference to FIG. 9. In this reduction gear mechanism, a driving gear 47 which rotates integrally with the take-up shaft 14 is meshed with a reduction gear 96. The driving gear 47 and the reduction gear 96 together make up a reduction gear mechanism by means of intermittent motion in which, during one revolution of the driving gear 47, the reduction gear 96 successively rotates by two teeth and stops thereafter.

This intermittent motion of the reduction gear 96 is transmitted to the cam rotating gear 68 which meshes with the reduction gear 96 via an interlocking gear portion 98. The interlocking gear portion 98 rotates integrally with the reduction gear 96, whereby the cam member 32 formed integrally with the cam rotating gear 68 is rotated.

(Switching Motion Between ALR and ELR)

An operation of the webbing take-up device 10 and a motion of the switching mechanism of ALR and ELR according to the first embodiment of the present invention will be described with reference to FIG. 1 and FIGS. 10 through 16. In the Figures, description of some parts (or portions) of the components are omitted for simplicity of explanation.

In a state in which the entire amount of the unillustrated webbing is taken up by the take-up shaft 14, due to the rotation of the take-up shaft 14 of the webbing take-up device 10 in the direction opposite to the direction of arrow A, the pawl portion 108 of the ALR pawl 22 is apart (disengaged) from the externally toothed ratchet wheel 20 of the locking wheel 18. Namely, the driven platform 116 of the ALR pawl 22 runs onto the other end portion (i.e., the end portion at convex portion 118 side) of the braking operational portion 76 of the disc control 30 so that the pawl portion 108 of the ALR pawl 22 is separated from and not allowed to engage with the externally toothed ratchet wheel 20 of the locking wheel 18.

Further, in this state in which the entire amount of the webbing is taken up, since a braking portion 64 of the cam member 32 opposes a pawl portion 132 of the sensor pawl 24, the sensor pawl 24 is not allowed to engage with the externally toothed ratchet wheel 20 of the locking wheel 18. In this state, the locking device does not operate due to the operation of the acceleration sensor device 120. That is, in this state, the webbing can be freely unwound.

Next, when a vehicle occupant seated on the seat starts to unwind the webbing, the driving gear 47 rotates in the direction indicated by arrow B following the rotation of the take-up shaft 14. Then, the reduction gear 96 meshing with the driving gear 47 intermittently rotates in the direction of arrow C and the interlocking gear portion 98 integrated with the reduction gear 94 also rotates in the direction of arrow C. Further, the cam rotating gear 68 meshing with the interlocking gear 98 rotates in the direction of arrow B. Accordingly, the cam member 32 integrated with the cam rotating gear 68 rotates in the direction of arrow B without influence on the disc control 30. (The disc control 30 does not rotate or rotate little in this case.)

In the state described above, the cam member 32, which rotates at a low speed due to reduction (mechanism), the cam protrusion 62 moves in the direction from the vicinity of the abutting end portion 76A toward the pressure-receiving surface 78 on the smaller-diameter portion 30A of the disc control 30. At this time, the disc control 30 receives some force, due to friction with the cam member 32, which makes it to rotate slightly. The rotational operation due to friction with the cam member 32, however, is restricted since the driven platform 116 of the ALR pawl 22 strikes against the projection at the abutting end portion 76A or the convex portion 118. Therefore, the ALR pawl 22 is kept in a state in which the driven platform 116 thereof still runs over the braking operational portion 76 of the disc control 30, and it is not allowed for the pawl portion 108 of the ALR pawl 22 to engage with the externally toothed ratchet wheel 20.

In this state, due to the rotation of the cam member 32, the braking portion 64 of the cam member 32 no longer opposes the pawl portion 132 of the sensor pawl 24. Namely, in this state, the sensor pawl 24.can engage with the externally toothed ratchet wheel 20 (i.e., an ELR mode).

In the ELR mode, the vehicle occupant harnesses the webbing by engaging the buckle. The disc control 30 does not move in a large amount even if a small amount of the webbing is taken up or unwound due to a change in the occupant's posture or the like, so the ELR mode is not switched. Accordingly, when an acceleration greater than or equal to a predetermined value is applied, the acceleration sensor device 120 operates so that the pawl portion 132 of the sensor pawl 24 engages with the externally toothed ratchet wheel 20 of the locking wheel 18. As a result, the locking device prevents the take-up shaft 14 from rotating in the direction in which the webbing is unwound, and thereby restrains the vehicle occupant.

The operation in which the mode of use of the webbing take-up device 10 is switched from the ELR mode to the ALR mode will be described.

Figure 10:
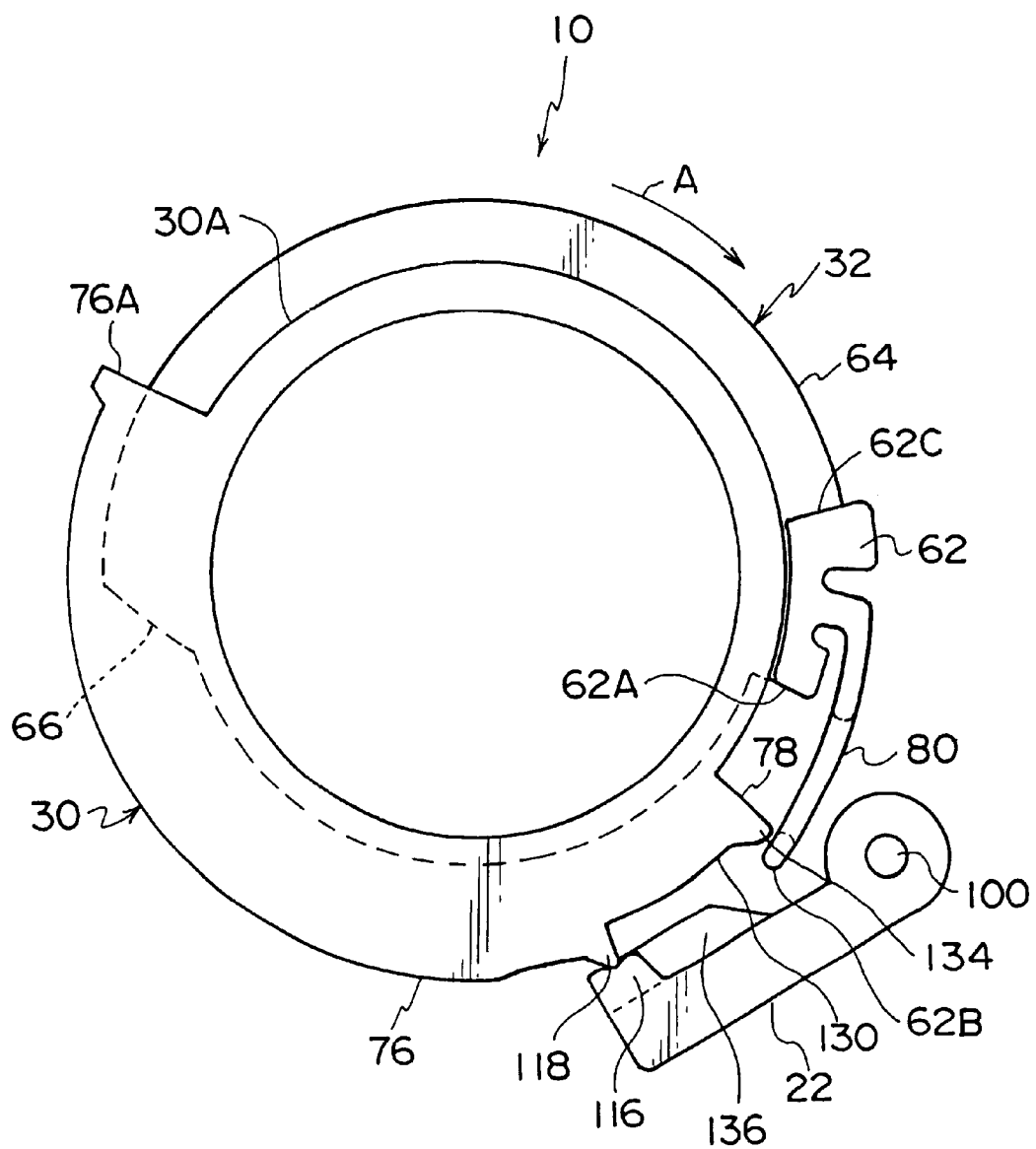
FIG. 10 is a front view of main portions that illustrates an operation of the ALR/ELR switching mechanism of the webbing take-up device relating to the first embodiment of the present invention.

In a state in which the webbing is harnessed (i.e., an ELR mode), even if the take-up shaft 14 rotates within a fixed range in the direction in which the webbing is unwound or taken-up due to a shift in the posture of the occupant or due to differences in the physical build of the occupant, the state in which the ALR pawl 22 is held by the disc control 30 remains unchanged, as described above. However, just before a state is reached in which the harnessing range of the webbing is exceeded and the entire amount of the webbing is unwound, as shown in FIG. 10, the tongue portion 80 of the cam protrusion 62 is guided to the intermediate holding surface 130 side of the disc control 30 by the tongue introducing portion 136 of the ALR pawl 22 in which the driven platform 116 thereof is engaged with the convex portion 118 of the disc control 30. Here, because shape and dimension of the tongue portion 80 of the cam protrusion 62 have been set so as not to interfere with the convex portion 134 of the intermediate holing surface 130, neither is the above-described entering motion of the tongue portion 80 prevented, nor is the disc control 30 moved.

Figure 11:
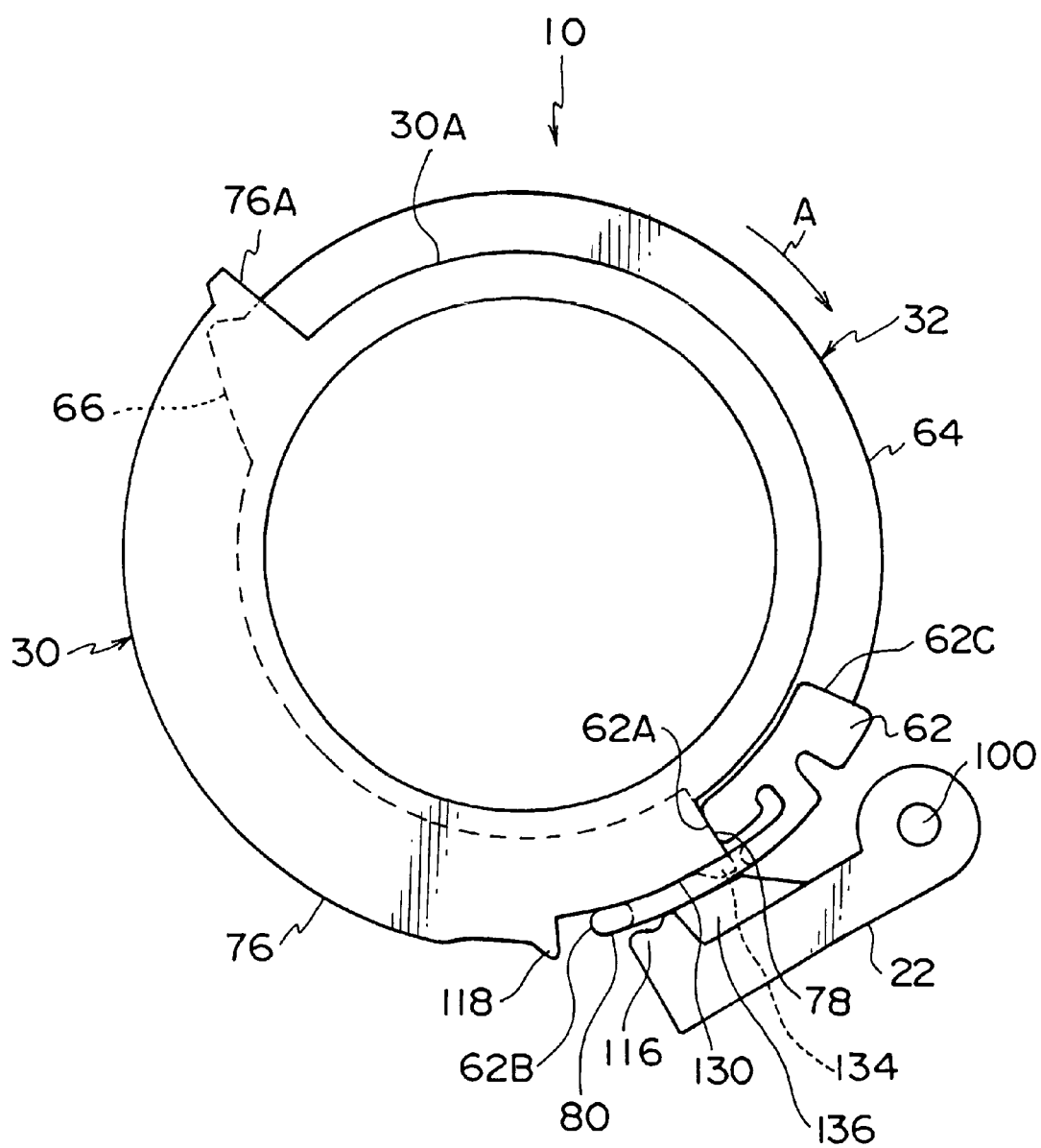
FIG. 11 is a front view of main portions that illustrates an operation of the ALR/ELR switching mechanism of the webbing take-up device relating to the first embodiment of the present invention.

As the webbing is further unwound, as shown in FIG. 11, the first pressing surface 62A of the cam protrusion 62 abuts against the pressure-receiving surface 78 of the disc control 30 and presses the same, compellingly rotates the disc control 30, and then disengages the driven platform 116 of the ALR pawl 22 from the convex portion 118. Following this disengagement, the ALR pawl 22 is moved onto the tongue portion 80 which had entered on the intermediate holding surface 130. That is, the ALR pawl 22 is disposed in a state in which it is separated from the intermediate holding surface 130 by the thickness of the tongue portion 80. Therefore, the ALR pawl 22 is still unable to engage with the externally toothed ratchet wheel 20.

Figure 12:
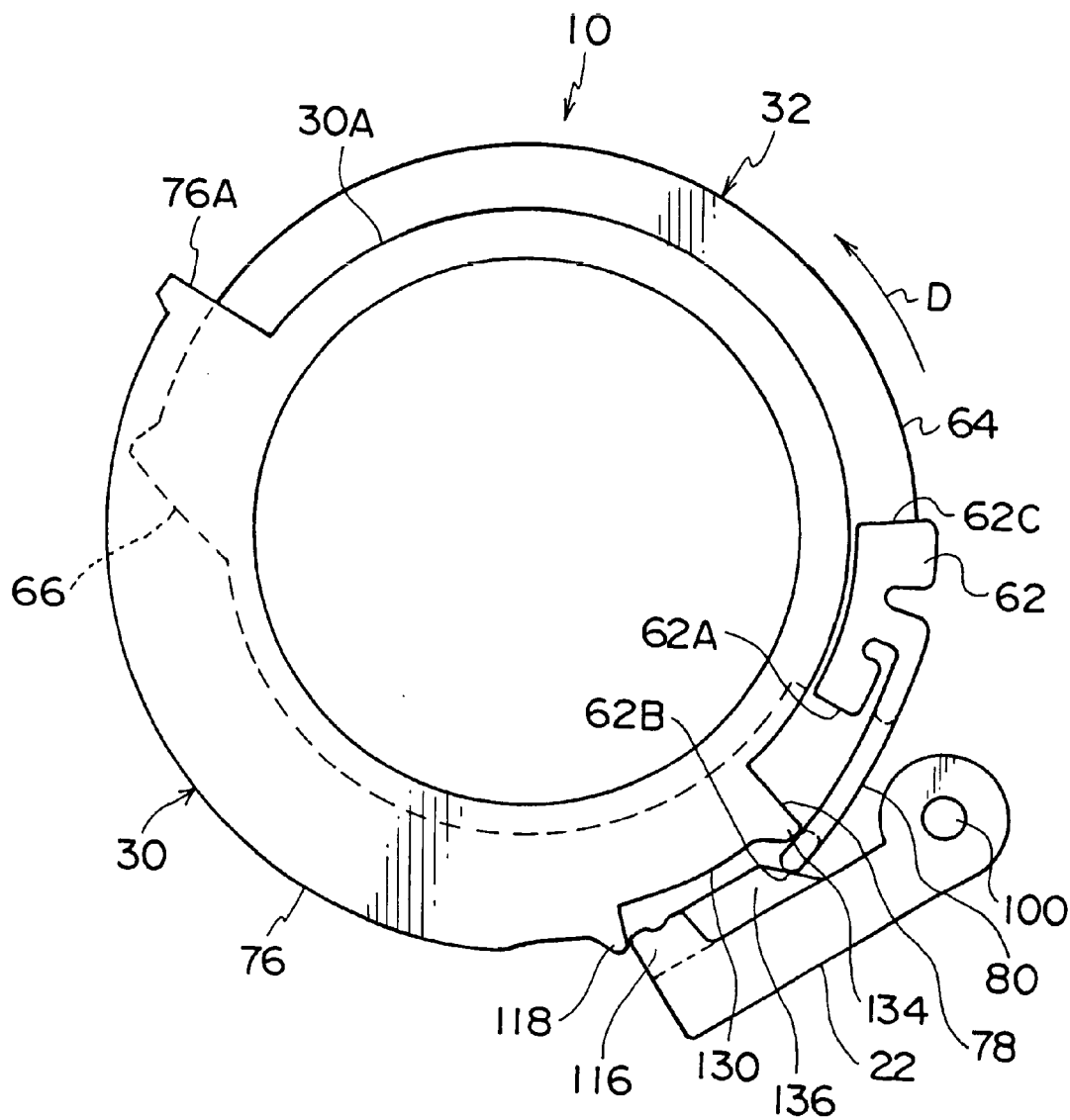
FIG. 12 is a front view of main portions that illustrates an operation of the ALR/ELR switching mechanism of the webbing take-up device relating to the first embodiment of the present invention.

Thereafter, a predetermined amount of the webbing is taken up from a state in which the entire amount of the wetting is unwound. Due to this taking-up operation of the webbing, as shown in FIG. 12, the cam member 32 rotates in the direction (the direction of arrow D) opposite to the direction described above, and the tongue portion 80 is thereby gradually moved apart from the intermediate holding surface 130. In this case, when the tongue portion 80 runs over the convex portion 134 of the intermediate holding portion 130, the convex portion 118 of the disc control 30 strikes against the driven platform 116 of the ALR pawl 22 to restrict further rotation of the disc control 30. Accordingly, at the time at which the tongue portion 80 runs over the convex portion 134 of the intermediate holding surface 130 and a predetermined amount of the webbing determined by the length of the tongue portion 80 is taken up, the tongue portion 80 is completely separated from the ALR pawl 22 (i.e., from the tongue NA X introducing portion 136). As a result, the ALR pawl 22 is disposed on the intermediate holding surface 130 and the ALR pawl 22 is still kept unable to engage with the externally toothed ratchet wheel 20.

Figure 13:
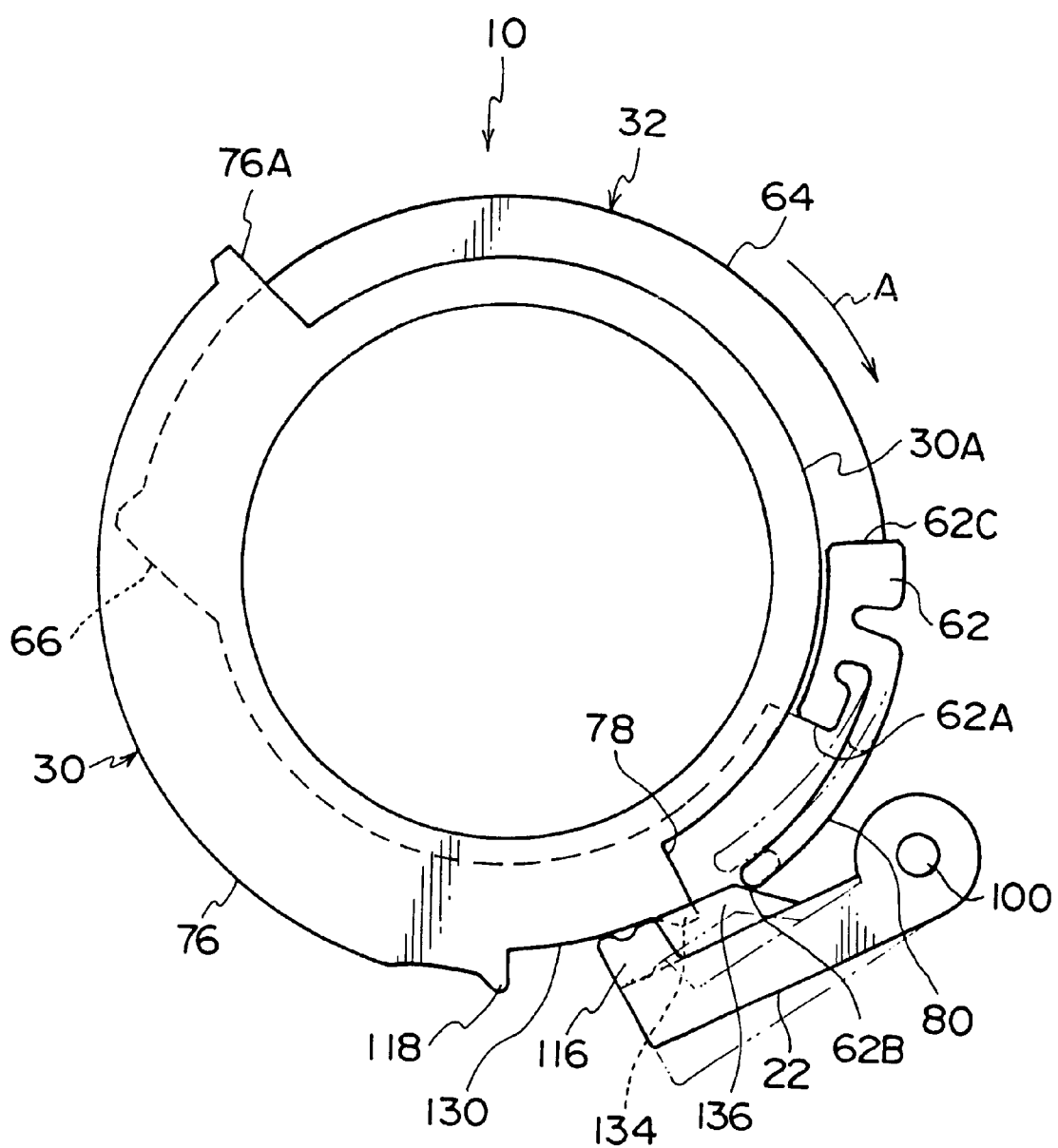
FIG. 13 is a front view of main portions that illustrates an operation of the ALR/ELR switching mechanism of the webbing take-up device relating to the first embodiment of the present invention.

Subsequently, the entire amount of the webbing is unwound again. With this unwinding operation, as shown in FIG. 13, the tongue portion 80 of the cam protrusion 62 moves again toward the intermediate holding surface 130, and the tongue portion 80 of the cam protrusion 62 enters toward the pressure-receiving surface 78 of the intermediate holding surface 130 while being guided by the tongue introducing portion 136 of the ALR pawl 22. At this time, the tongue portion 80 moves toward the small diameter portion 30A side of the intermediate holding surface 130 while being deflected somewhat. The urging force of the coil spring 112 urging the pawl portion 108 of the ALR pawl 22 in the direction in which the pawl portion 108 of the ALR pawl 22 engages with the externally toothed ratchet wheel 20 of the locking wheel 18 is set greater than the deflection force of the tongue portion 80. As a result, the ALR pawl 22 is never pushed back due to the deflected tongue portion 80.

Figure 14:
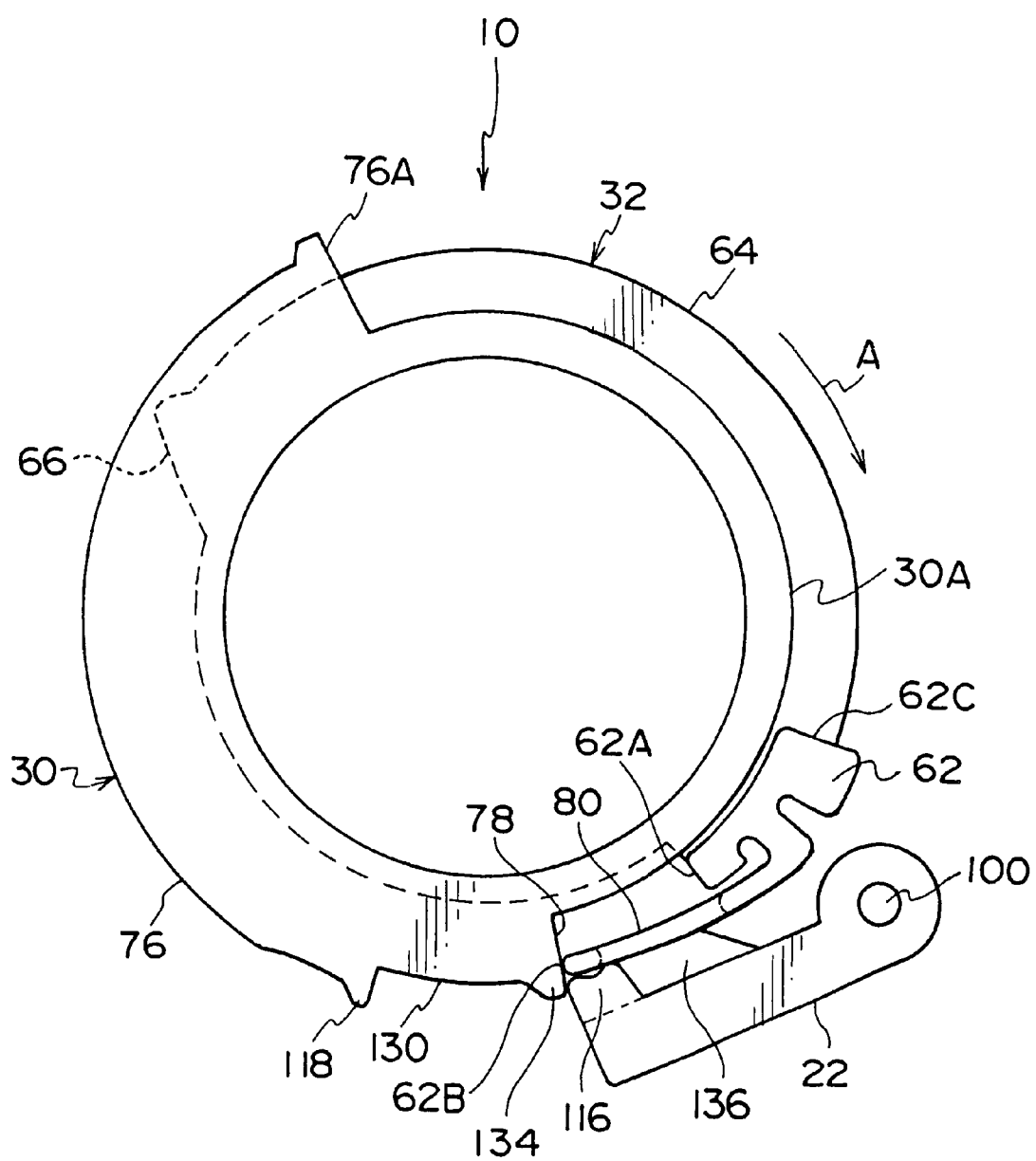
FIG. 14 is a front view of main portions that illustrates an operation of the ALR/ELR switching mechanism of the webbing take-up device relating to the first embodiment of the present invention.

When the webbing is further unwound, as shown in FIG. 14, the second pressing surface 62B of the tongue portion 80 abuts against the pressure-receiving surface 78 of the disc control 30 and presses the same, compellingly rotates the disc control 30 by an amount of the length of the tongue portion 80, and then disengages the driven platform 116 of the ALR pawl 22 from the convex portion 134. Following this disengagement, the ALR pawl 22 is moved onto the tongue portion 80 which had abutted against the pressure-receiving surface 78. That is, the ALR pawl 22 is disposed in a state in which it is separated from the small diameter portion 30A of the disc control 30 by the thickness of the tongue portion 80 and a predetermined amount. Therefore, the ALR pawl 22 is still unable to engage with the externally toothed ratchet wheel 20.

Figure 15:
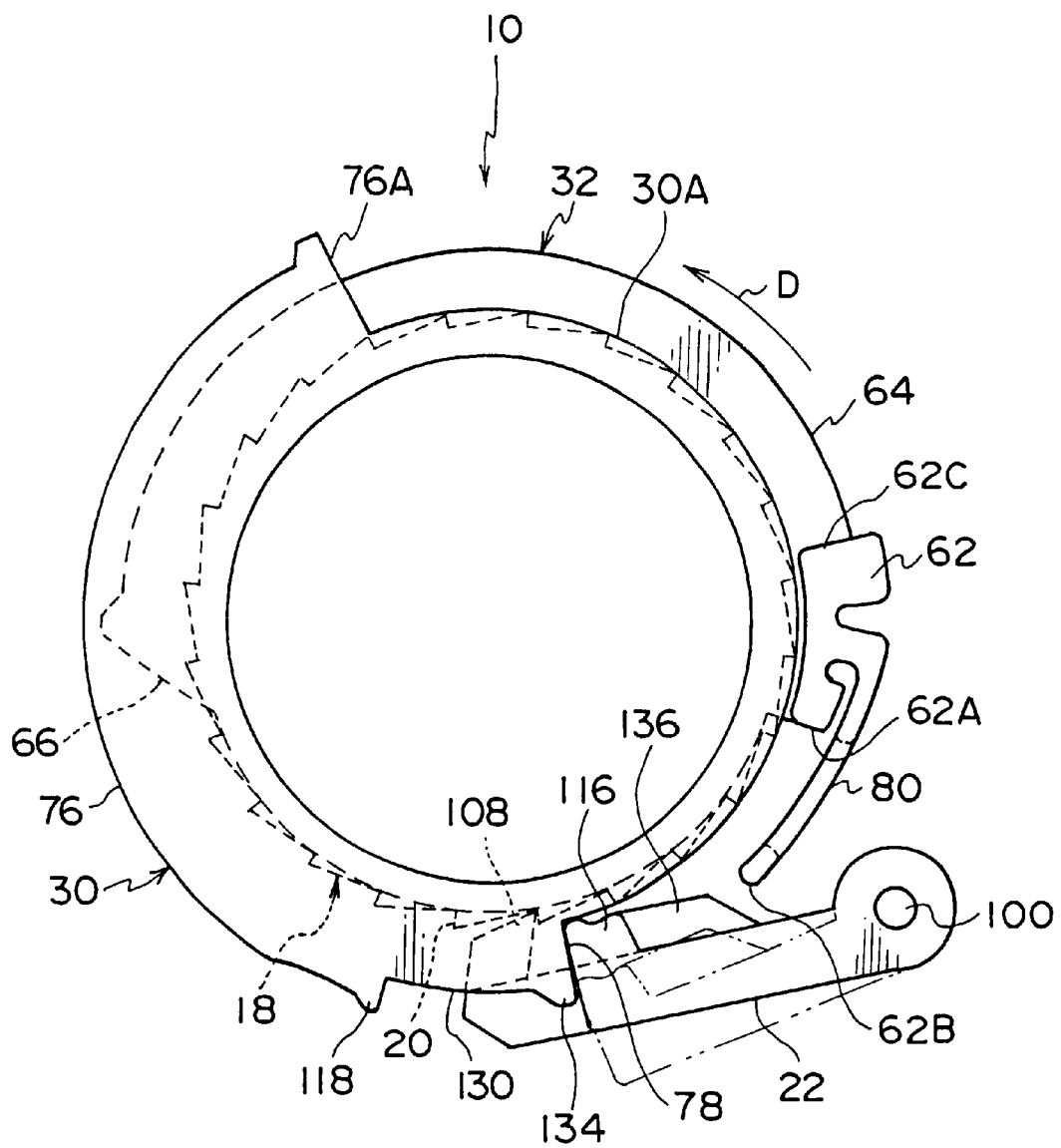
FIG. 15 is a front view of main portions that illustrates an operation of the ALR/ELR switching mechanism of the webbing take-up device relating to the first embodiment of the present invention.

Thereafter, the webbing is taken up again (for a second time) from a state in which the entire amount of the wetting is unwound. Due to this taking-up operation of the webbing, as shown in FIG. 15, the cam member 32 rotates in the direction (the direction of arrow D) opposite to the direction described above, and the tongue portion 80 is thereby gradually moved apart from the pressure-receiving surface 78. In this case, when the tongue portion 80 moves apart from the pressure-receiving surface 78, the driven platform 116 of the ALR pawl 22 strikes against the pressure-receiving surface 78 to restrict rotation of the disc control 30. Accordingly, at the time when an enough amount of the webbing is taken up for the tongue portion 80 to be spaced from the tongue introducing portion 136 of the ALR pawl 22, the pawl portion 108 of the ALR pawl 22 engages with the externally toothed ratchet wheel 20 of the locking wheel 18 due to the urging force from the twisted coil spring 112. As a result, the mode of the webbing take-up device 10 is switched to the mode of use for ALR.

In the ALR mode of use shown in FIG. 15, taking-up of the webbing is allowed while unwinding of the webbing is not. That is, when the webbing is unwound, the pawl portion 108 of the ALR pawl 22 is engaged with the externally toothed ratchet wheel 20 of the locking wheel 18, but when the webbing is taken up, because the externally toothed ratchet wheel 20 of the locking wheel 18 and the pawl portion 108 of the ALR pawl 22 can slidingly rotate relative to each other (Because each of teeth of the externally toothed ratchet wheel 20 and the pawl portion 108 are provided so as not to mesh with each other in the case of the webbing being taken up), it is possible for the webbing to be taken up. On the other hand, when the webbing is about to be unwound in the ALR mode of use, because the pawl portion 108 of the ALR pawl 22 has engaged with the externally toothed ratchet wheel 20, the rotation of the locking wheel 18 due to the unwinding of the webbing is blocked, whereby relative rotation between the locking wheel 18 and the take-up shaft 14 is produced and the locking device is operated. As a result, unwinding of the webbing is prevented.

Figure 16:
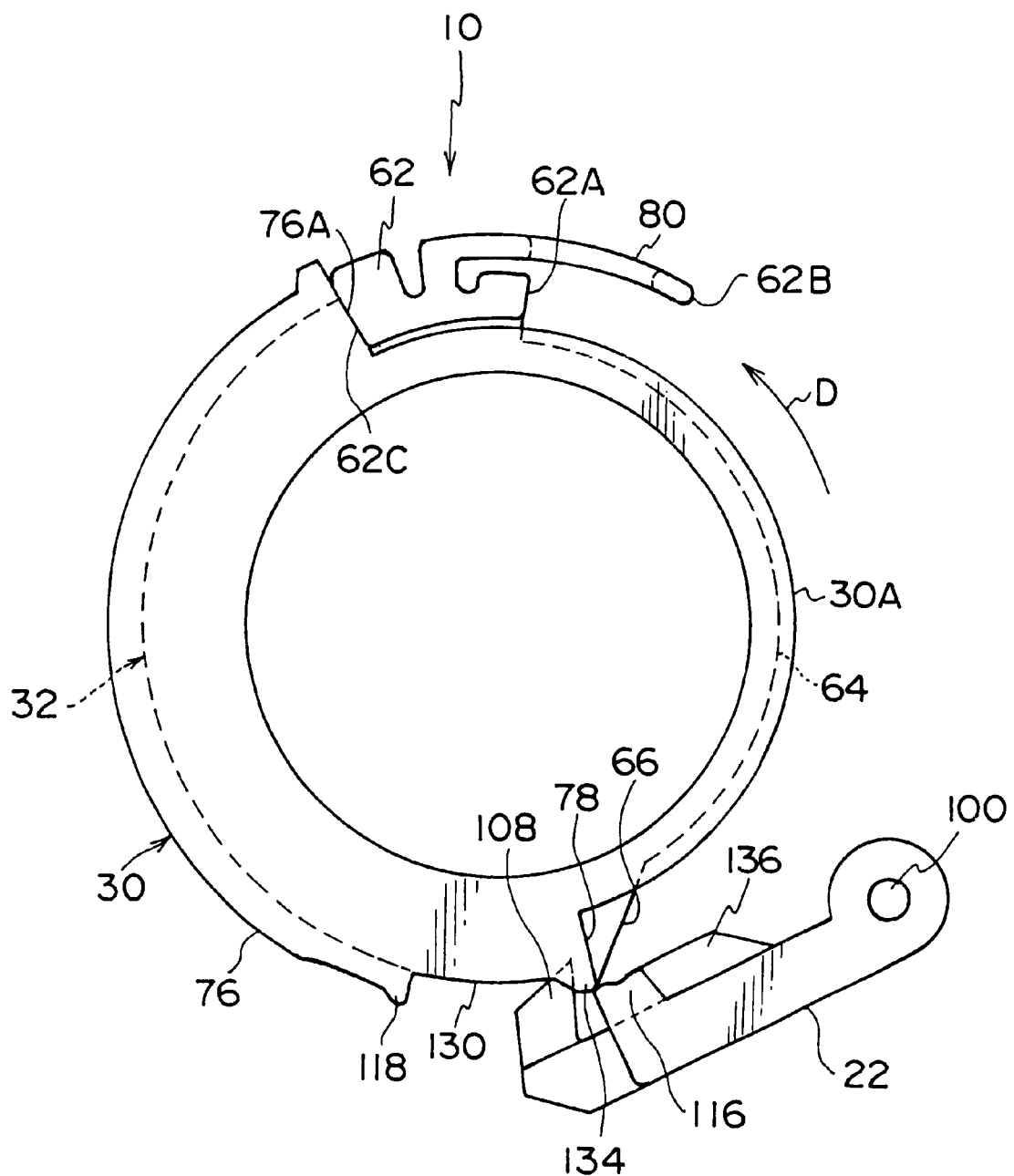
FIG. 16 is a front view of main portions that illustrates an operation of the ALR/ELR switching mechanism of the webbing take-up device relating to the first embodiment of the present invention.

When the webbing take-up device 10 is to return to the ELR mode of use after switching to ALR mode of use as described above, a sufficient amount of the webbing is taken up. When an amount of webbing greater than the amount ordinarily required to harness a vehicle occupant is taken up during the ALR mode shown in FIG. 15, the cam member 32 rotates in the direction of arrow D by means of a gear mechanism, and a guide surface portion 66 of the cam member 32 pushes the driven platform 116 of the ALR pawl 22 from downward to lift the same on the convex portion 134 of the disc control 30 as shown in FIG. 16. When the webbing is further taken up, the third pressing surface 62C of the cam protrusion 62 abuts against the abutting end portion 76A of the disc control 30, thereby pushing and rotating the same in the direction of arrow D. The driven platform 116 of the ALR pawl 22, on the intermediate holding surface 130 of the disc control 30, is then lifted onto the braking operational portion 76. As a result, the webbing take-up device 10 is switched to an ALR released state in which the pawl portion 108 of the ALR pawl 22 is separated from and not allowed to engage with the externally toothed ratchet wheel 20 of the locking wheel 18. Namely, the webbing take-up device 10 is reset to the above-described initial mode.

As described above, in the webbing take-up device 10 relating to the first embodiment of the present invention, when the webbing take-up device 10 is switched from the ALR mode to the ELR mode, by unwinding the entire amount of the webbing, the first pressing surface 62A of the cam member 32 (cam protrusion 62) presses and rotates the disc control 30 so as to move the ALR pawl 22 from the braking operational portion 76 to be placed on the intermediate holding surface 130. Further, from this state in which the entire amount of the webbing has been unwound, by unwinding the entire amount of the webbing again after taking up a predetermined amount of the webbing, the second pressing surface 62B of the cam member 32 (cam protrusion 62) again presses and rotates the disc control 30 so as to move the ALR pawl 22 from the intermediate holding surface 130 to be placed on the tongue portion 80 of the cam member 32. Then, from this state in which the entire amount of the webbing is unwound, by taking up the webbing again, the webbing take-up device 10 is switched to the ALR mode where the cam member 32 rotates to be separated (disengaged) from the ALR pawl 22 and then the ALR pawl 22 engages with the externally toothed ratchet wheel 20 of the locking wheel 18 to prevent the locking wheel 18 from rotating.

As described above, in the webbing take-up device 10 relating to the first embodiment of the present invention, the switching from the ELR mode to the ALR mode is achieved by conducting the respective unwinding and taking-up operations of the webbing twice in sequential order. Accordingly, unless the aforementioned switching is carried out by the conscious volition of the vehicle occupant, an unintended and unnecessary switching from the ELR mode to the ALR mode which may make the vehicle occupant feel unpleasant does not happen.

Further, as a result, it is not necessary to set the overall length of the webbing to be much longer than the length ordinarily required to harness the vehicle occupant. Therefore, increases in size and cost can be avoided.

Description of another embodiment of the present invention will next be given. It should be noted that parts basically the same as those of the first embodiment will be denoted by the same reference numerals, and description thereof will be omitted.

Second Embodiment

Figure 17:
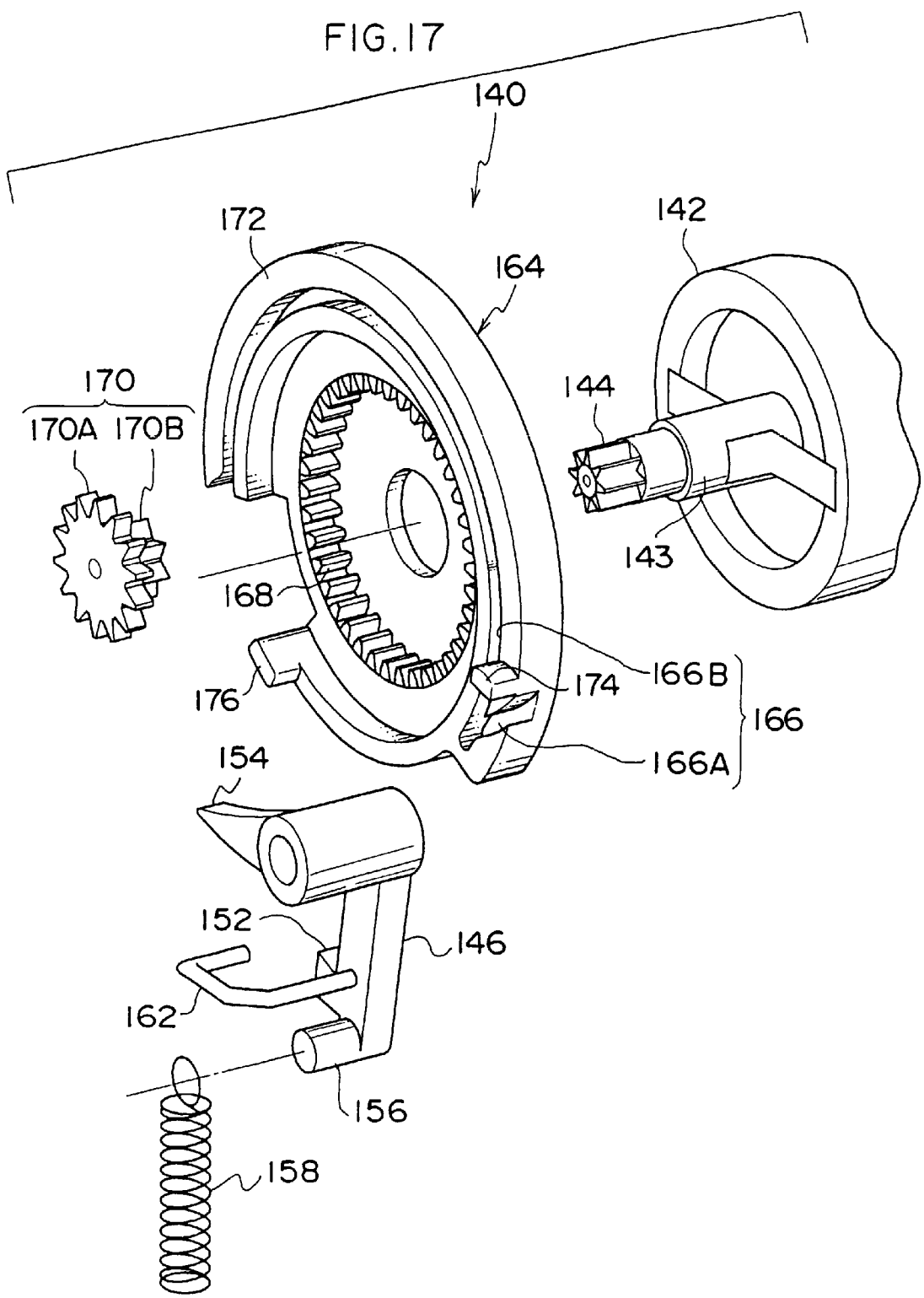
FIG. 17 is an exploded perspective view that illustrates main structural components of an ALR/ELR switching mechanism of a webbing take-up device relating to a second embodiment of the present invention.

FIG. 17 is a perspective view that illustrates the main components of a webbing take-up device 140 relating to a second embodiment of the present invention. Each of FIGS. 18 through 24 is a front view of a structure of main portions of the webbing take-up device 140.

In the webbing take-up device 140, the tip of the take-up shaft 14 is fitted with a transmission member 142, and a pinion gear 144 is formed at a tip of the transmission member 142.

An ALR pawl 146 is rotatably supported by a support shaft 150 formed at an end of a sensor holder 148, and is able to rotate about the support shaft 150 between a position removed from the locking wheel 18 and a position close to the locking wheel 18. A pawl portion 152 of the ALR pawl 146 corresponds to an externally toothed ratchet wheel 20 of the locking wheel 18 and is able to be fitted with the externally toothed ratchet wheel 20 by rotating about the support shaft 150 to move close to the externally toothed ratchet wheel 20. In a state in which the ALR pawl 146 has engaged with the externally toothed ratchet wheel 20, rotation of the locking wheel 18 in the direction in which the webbing is unwound is prevented.

A releasing arm 154 which extends in the direction toward the locking wheel 18 is formed in the vicinity of the support shaft 150 of the ALR pawl 146. Accordingly, the ALR pawl 146 can rotate the releasing arm 154 to move in the direction in which it engages with the externally toothed ratchet wheel 20 of the locking wheel 18 by pressing the releasing arm 154 in the clockwise direction of FIGS. 18 through 24 around the support shaft 150.

An engaging protrusion 156 is formed in the vicinity of an end portion opposite to the support shaft 150 of the ALR pawl 146. One end of a compressed coil spring 158 which serves as a switching holding member engages with the engaging protrusion 156. The other end of the compressed coil spring 158 is accommodated within a U-shaped spring accommodating portion 160 formed at the sensor holder 148. As a result, the compressed coil spring 158 forms a snap action which maintains, by an urging force, one of a state in which the ALR pawl 146 is separated from the externally toothed ratchet wheel 20 of the locking wheel 18 and a state in which the ALR pawl 146 is moved in the direction in which it engages with the externally toothed ratchet wheel 20 of the locking wheel 18.

An auxiliary arm 162 is mounted on the ALR pawl 146. The auxiliary arm 162 is fixed to the ALR pawl 146, and the tip thereof is hooked in an L-shape and is fitted into a guide groove 166 of a releasing gear 164 (described later).

The releasing arm 154 of the ALR pawl 146 is fitted with the releasing gear 164 serving as a cam member. The releasing gear 164 is generally formed in a disc-shape, and is rotatably supported by a protruding portion 143 of the transmission member 142. The internal teeth 168 formed at the inside wall of the releasing gear 164 mesh with the pinion gear 144 via a gear 170. The gear 170 is a double-gear in which a large gear 170A and a small gear 170B are integrally formed. The gear 170 is rotatably supported by an unillustrated cover, the large gear 170A being meshed with the pinion gear 144 and the small gear 170B being meshed with the internal teeth 168. As a result, reduced rotation of the take-up shaft 14 is transmitted to the releasing gear 164, and the releasing gear 164 makes almost one revolution between webbing taking-up and unwinding of the take-up shaft 14 and rotates in the direction opposite to the direction in which the take-up shaft 14 rotates.

Further, a rib portion 172 is formed to protrude axially from the circumference of the releasing gear 164. A first protrusion 174 and a second protrusion 176 are formed to protrude axially from respective portions at the outer circumference of the rib portion 172. These first and second protrusions 174 and 176 respectively correspond to the releasing arm 154 of the ALR pawl 146.

That is, when the take-up shaft 14 rotates in the direction in which the webbing is taken up, the releasing gear 164 rotates in the direction (the direction of arrow B in FIGS. 18 through 24) opposite thereto, and the second protrusion 176 presses the releasing arm 154 of the ALR pawl 146 to rotate in the direction separate from the externally toothed ratchet wheel 20. On the other hand, when the take-up shaft 14 rotates in the direction in which the webbing is unwound, the releasing gear 164 rotates in the direction of arrow A in FIGS. 18 through 24. When the releasing gear 164 makes almost one revolution, the first protrusion 174 presses the releasing arm 154 in the direction opposite to the direction in which the webbing is taken up, and rotates the ALR pawl 146 in the direction toward the externally toothed ratchet wheel 20.

A guide groove 166 is formed at the rib portion 172 of the releasing gear 164 along the circumferential direction thereof. As shown in detail in FIGS. 18 through 24, the guide groove 166 is composed of a first guide portion 166A which opens at the circumference of the rib 172 near the first protrusion 174 and a second guide portion 166B which is formed continuously to the first guide portion 166A and opens at the circumference of the rib 172 at the second protrusion 176 side thereof. The aforementioned auxiliary arm 162 of the ALR pawl 146 can enter these grooves. Namely, when the ALR pawl 146 rotates in the direction toward the externally toothed ratchet wheel 20 by the pressure from the first protrusion 174, the auxiliary arm 162 abuts against the circumference of the rib portion 172 of the releasing gear 164. However, if the opening of the first guide portion 166A is disposed to face the auxiliary arm 162, the auxiliary arm 162 can enter the first guide portion 166A.

Moreover, when the releasing gear 164 rotates in a state in which the auxiliary arm 162 is placed in the guide groove 166, the auxiliary arm 162 is guided along the guide groove 166, and, following this, the ALR pawl 146 is able to rotate about the support shaft 150. Here, the second guide portion 166B of the guide groove 166 is formed at a radial direction inner side portion by a predetermined dimension relative to the circumference of the rib portion 172. Dimensions of each part are set such that, when the auxiliary arm 162, in the first guide portion 166A, enters the second guide portion 166B, the ALR pawl 146 engages with the externally toothed ratchet wheel 20 of the locking wheel 18.

Next, an operation of the webbing take-up device 140 relating to the second embodiment of the present invention and a movement of the ALR/ELR switching mechanism will be explained with reference to FIGS. 18 through 24.

Figure 18:
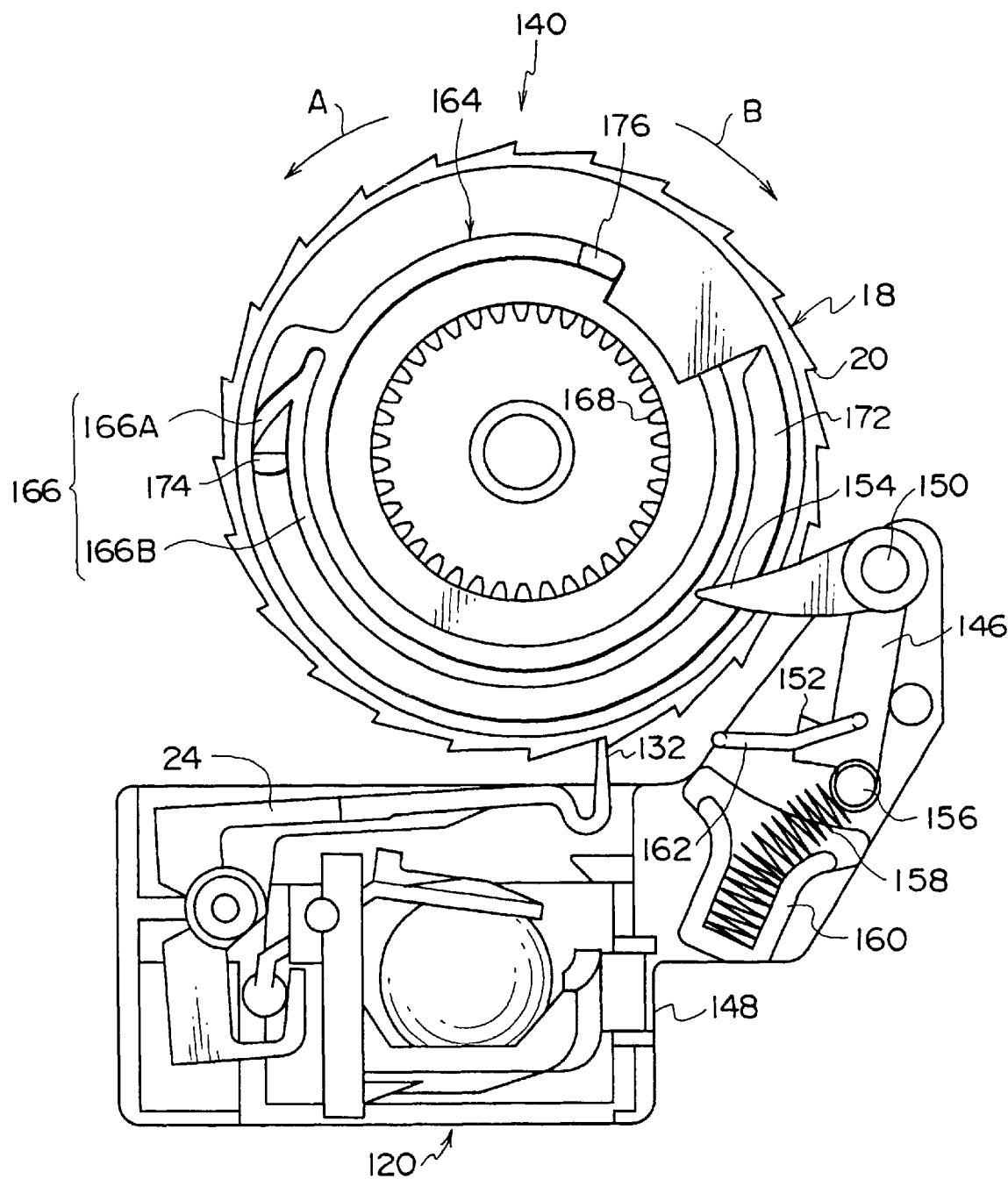
FIG. 18 is a front view of-main portions that illustrates an operation of the ALR/ELR switching mechanism of the webbing take-up device relating to a second embodiment of the present invention.

In a state in which the entire amount of the unillustated webbing is taken up by the take-up shaft 14 of the webbing take-up device 140, as shown in FIG. 18, the pawl portion 152 of the ALR pawl 146 is in a state in which it is separated (disengaged) from the externally toothed ratchet wheel 20 of the locking wheel 18. This state is maintained by a compressed coil spring 158. As a result, the locking mechanism of the take-up shaft 14 is in an ELR mode of use and the sensor pawl 24 can engage with the externally toothed ratchet wheel 20.

In the ELR mode, the vehicle occupant harnesses the webbing by engaging the buckle. The releasing gear 146 does not move in a large amount even if a small amount of the webbing is taken up or unwound due to a change in the occupant's posture or the like, so the ELR mode is not affected. Accordingly, when an acceleration greater than or equal to a predetermined value is applied, the acceleration sensor device 120 operates so that the pawl portion 132 of the sensor pawl 24 engages with the externally toothed ratchet wheel 20 of the locking wheel 18. With this arrangement, the locking device prevents the take-up shaft 14 from rotating in the direction in which the webbing is unwound, and thereby restrains the vehicle occupant.

The operation in which the mode of use of the webbing take-up device 10 is switched from the ELR mode to the ALR mode will be described hereinafter.

Figure 19:
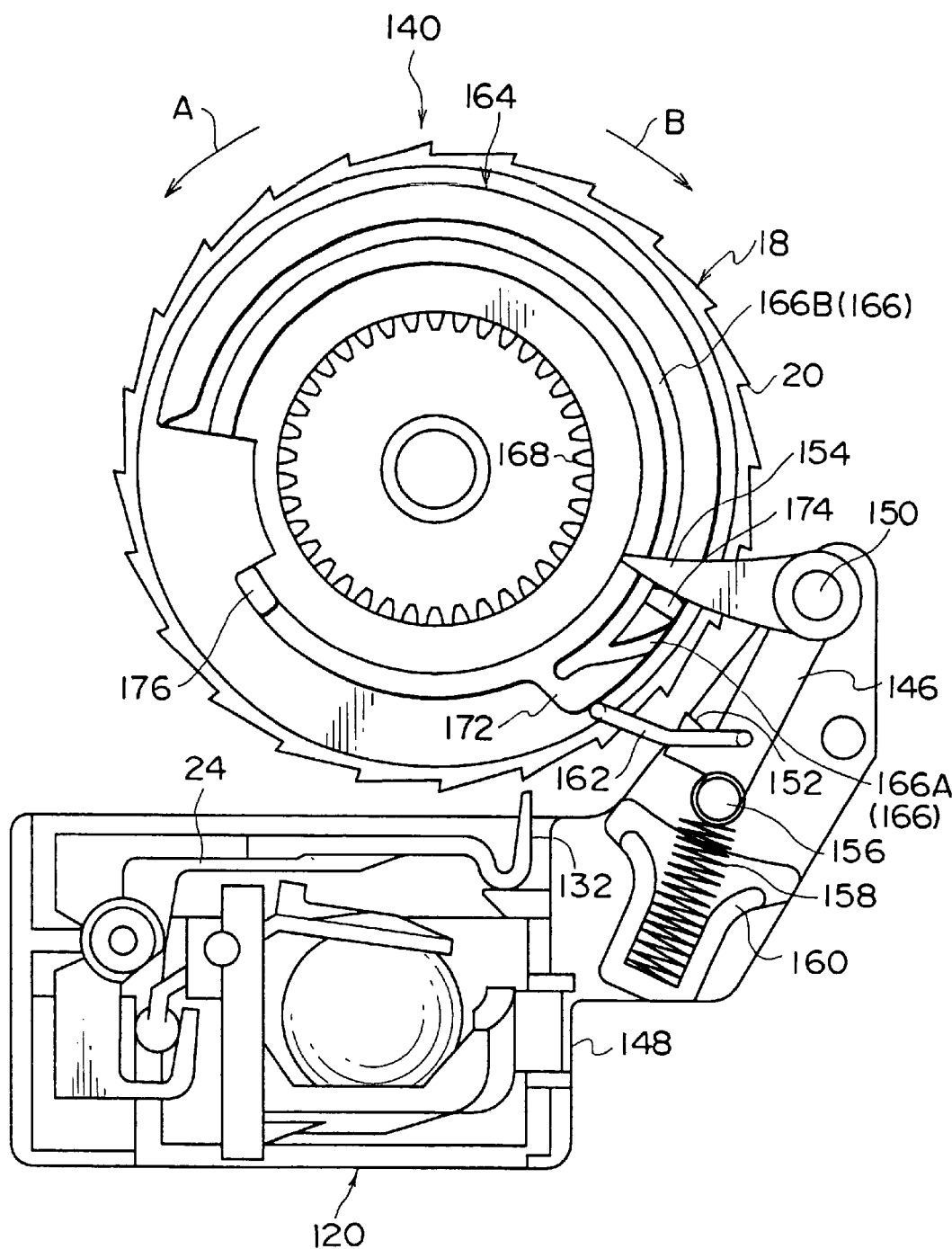
FIG. 19 is a front view of main portions that illustrates an operation of the ALR/ELR switching mechanism of the webbing take-up device relating to the second embodiment of the present invention.

In a state in which the webbing is harnessed (i.e., an ELR mode), even if the take-up shaft 14 rotates within a fixed range in the direction in which the webbing is unwound or taken-up due to a shift in the posture of the occupant or due to differences in the physical build of the occupant, the state in which the ALR pawl 146 is disengaged from the locking wheel 18 by the urging force from the compressed coil spring 15 remains unchanged, as described above. However, when a state is reached in which the harnessing range of the webbing is exceeded and the entire amount of the webbing is unwound, the first protrusion 174 of the releasing gear 164 abuts against the releasing arm 154 of the ALR pawl 146 and presses the same. The ALR pawl 146 is thereby rotated about the support shaft 150 in the direction in which the ALR pawl 146 approaches to the locking wheel 18. As a result, as shown in FIG. 19, the auxiliary arm 162 of the ALR pawl 146 abuts against the circumference of the rib portion 172 of the releasing gear 164. In this state, the ALR pawl 146 is still separated (disengaged) from the externally toothed ratchet wheel 20.

Figure 20:
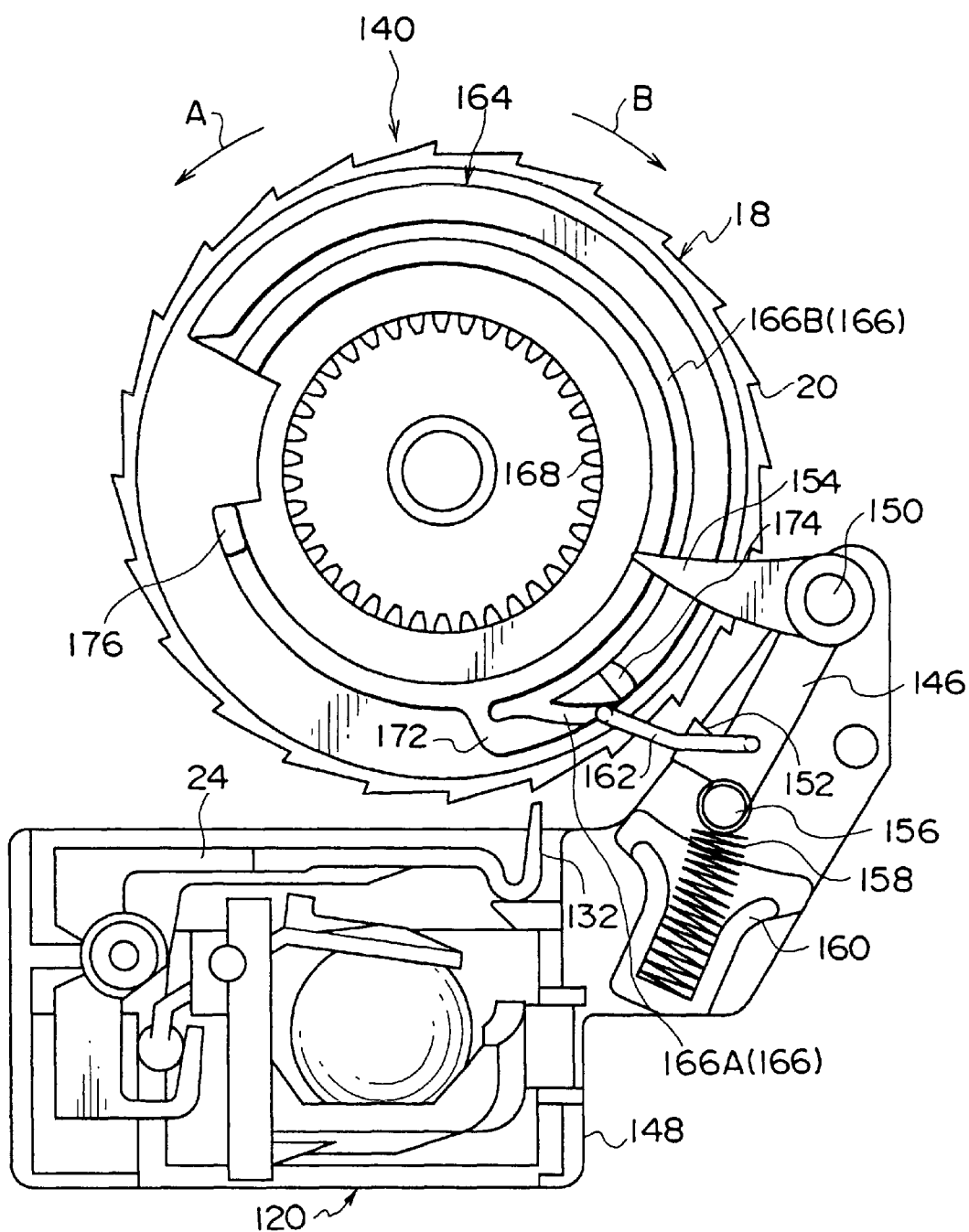
FIG. 20 is a front view of main portions that illustrates an operation of the ALR/ELR switching mechanism of the webbing take-up device relating to the second embodiment of the present invention.

Thereafter, a predetermined amount of the webbing is taken up from the state in which the entire amount of the wetting is unwound. Due to this taking-up operation of the webbing, the releasing gear 164 rotates in the direction opposite to the direction described above, and the opening of the first guide portion 166A of the guide groove 166 faces with the auxiliary arm 162 of the ALR pawl 146, as shown in FIG. 20. Accordingly, in this state, the auxiliary arm 162 is able to enter the first guide portion 166A.

Figure 21:
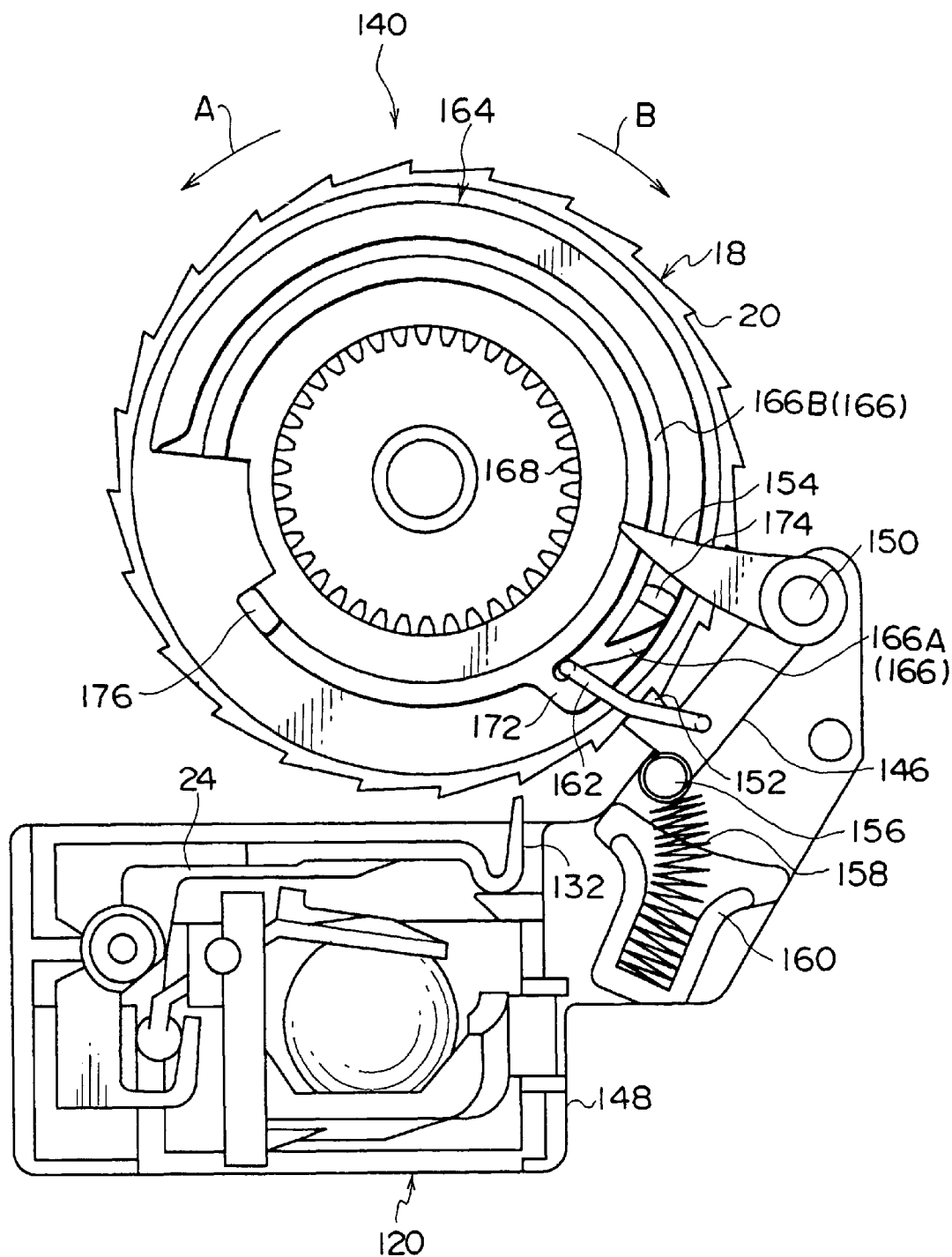
FIG. 21 is a front view of main portions that illustrates an operation of the ALR/ELR switching mechanism of the webbing take-up device relating to the second embodiment of the present invention.
Figure 22:
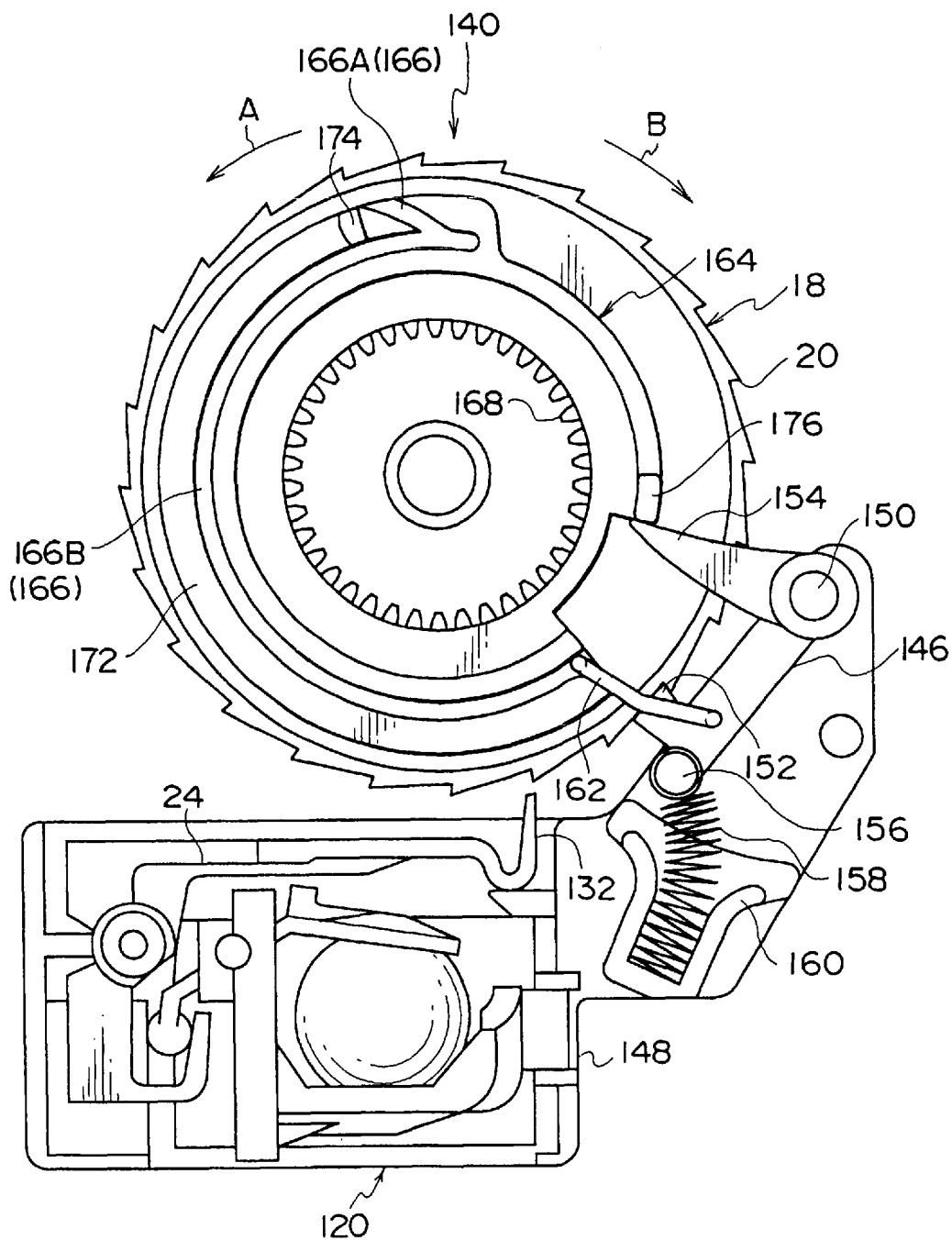
FIG. 22 is a front view of main portions that illustrates an operation of the ALR/ELR switching mechanism of the webbing take-up device relating to the second embodiment of the present invention.

Subsequently, the entire amount of the webbing is unwound again. With this unwinding operation of the webbing, the auxiliary arm 162 enters from the first guide portion 166A to the second guide portion 166B of the guide groove 166, as shown in FIG. 21. Here, because the second guide portion 166B of the guide groove 166 is formed at a radial direction inner side portion by a predetermined dimension relative to the circumference of the rib portion 172, as the auxiliary arm 162 moves from the first guide portion 166A toward the second guide portion 166B, the ALR pawl 146 rotates about the support shaft 150 and the pawl portion 152 thereof engages with the externally toothed ratchet wheel 20 of the locking wheel 18. As a result, the webbing take-up device 140 is switched to a mode of use for ALR, and the ALR pawl 146 is still kept in a state in which it engages with the externally toothed ratchet wheel 20 of the locking wheel 18 due to the urging force from the compressed coil spring 158.

In the ALR mode of use, taking-up of the webbing is allowed while unwinding of the webbing is not. That is, when the webbing is unwound, the pawl portion 152 of the ALR pawl 146 is engaged with the externally toothed ratchet wheel 20 of the locking wheel 18, but because the externally toothed ratchet wheel 20 of the locking wheel 18 and the pawl portion 152 of the ALR pawl 146 can slidingly rotate relative to each other (Because each of teeth of the externally-toothed ratchet wheel 20 and the pawl portion 108 are provided so as not to mesh with each other in the case of the webbing being taken up), it is possible for the webbing to be taken up. Moreover, the auxiliary arm 162 of the ALR pawl 146 moves along the second guide portion 166B of the guide groove 166 so that the releasing gear 164 is able to rotate freely. On the other hand, when the webbing is about to be unwound in the ALR mode of use, because the pawl portion 152 of the ALR pawl 146 has engaged with the externally toothed ratchet wheel 20, the rotation of the locking wheel 18 due to the unwinding of the webbing is blocked, whereby relative rotation between the locking wheel 18 and the take-up shaft 14 is produced and the locking device is operated. As a result, unwinding of the webbing is prevented.

Figure 23:
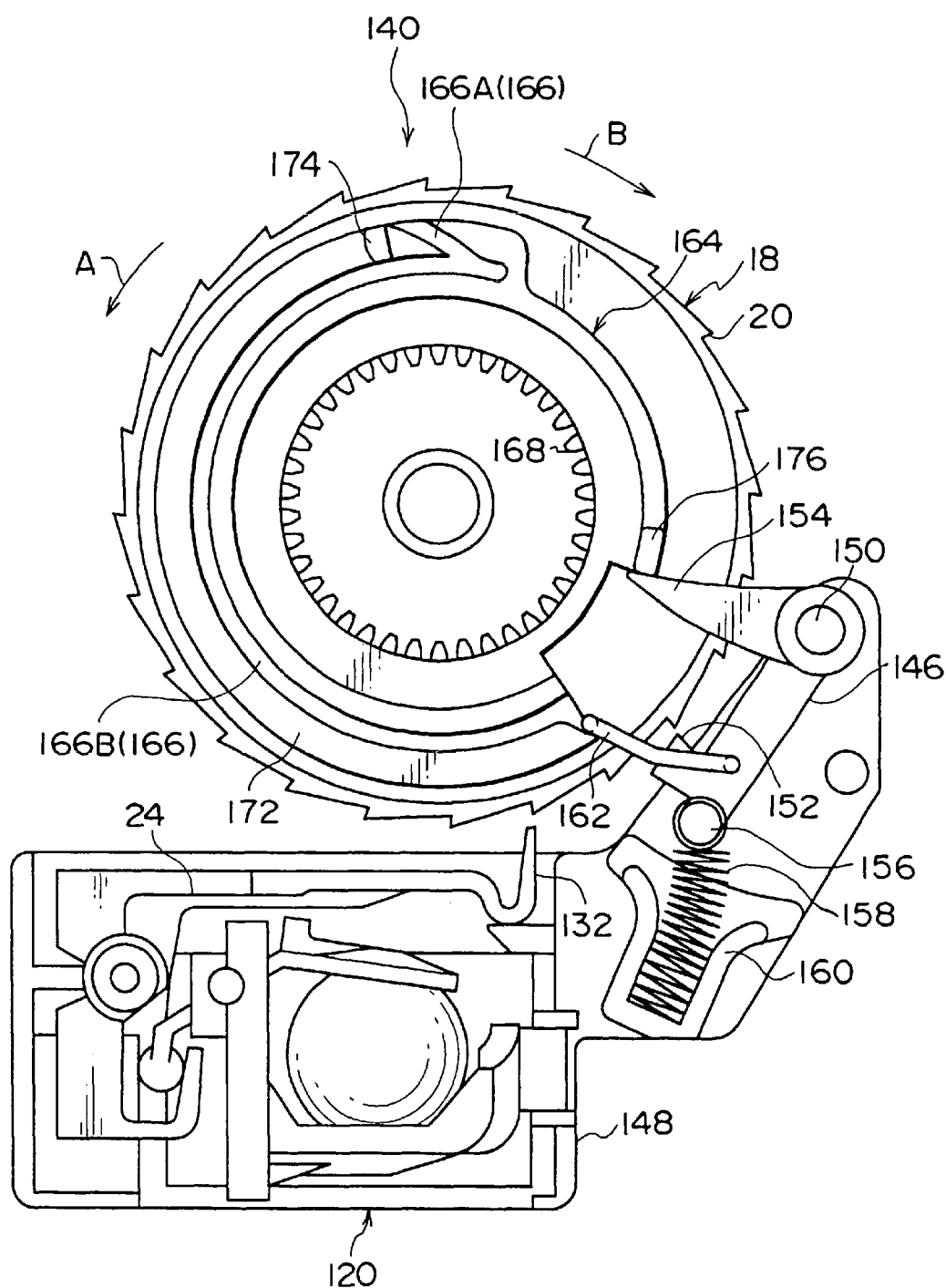
FIG. 23 is a front view of main portions that illustrates an operation of the ALR/ELR switching mechanism of the webbing take-up device relating to the second embodiment of the present invention.
Figure 24:
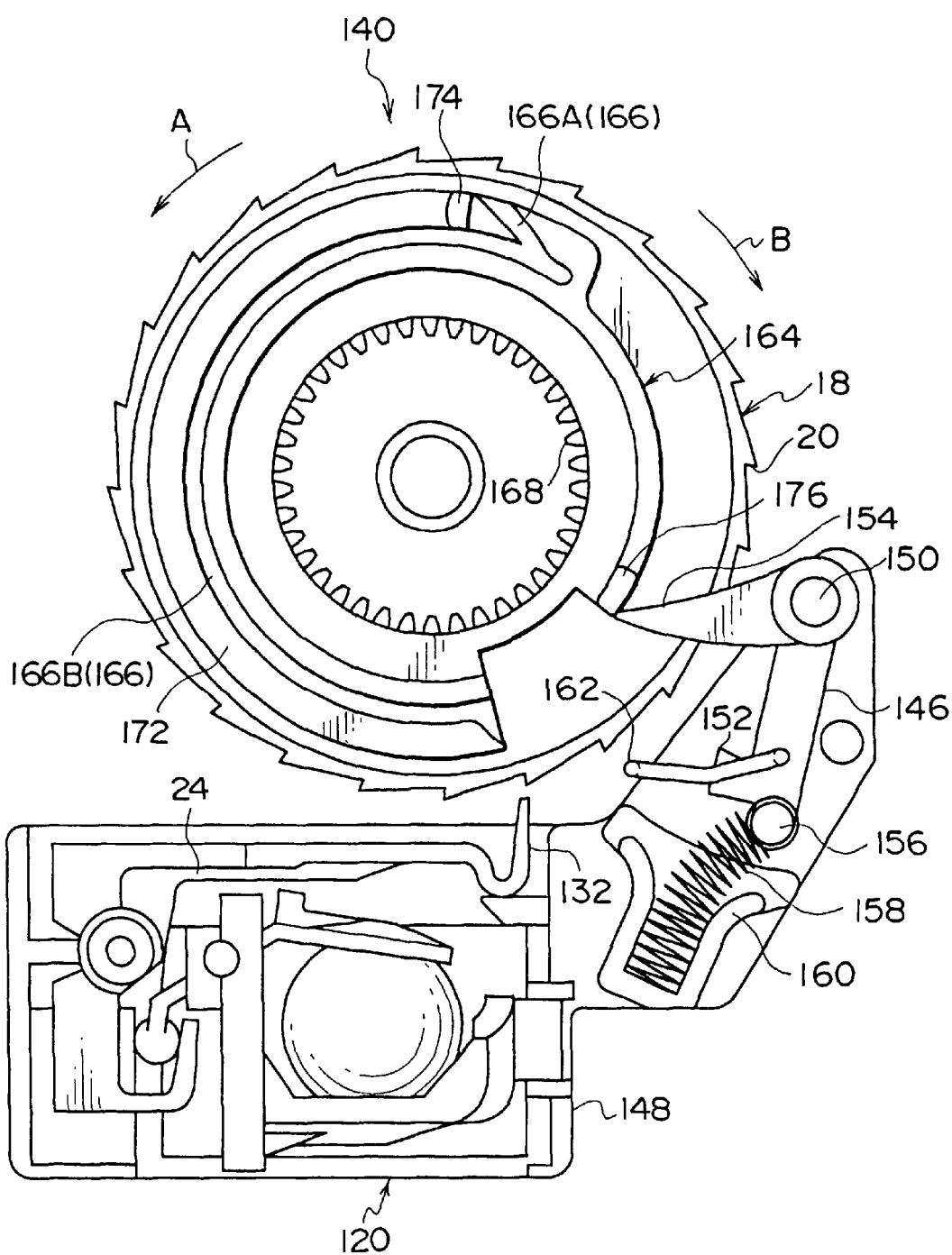
FIG. 24 is a front view of main portions that illustrates an operation of the ALR/ELR switching mechanism of the webbing take-up device relating to the second embodiment of the present invention.

When the webbing take-up device 140 is to return to the ELR mode of use after switching to ALR as described above, a sufficient amount of the webbing is taken up. When an amount of webbing greater than the amount ordinarily required to harness a vehicle occupant is taken up during the ALR mode, the second protrusion 176 of the releasing gear 164 abuts against the releasing arm 154 of the ALR pawl 146, shown in FIG. 22. When the releasing gear 164 is further rotated to press the releasing arm 154, the auxiliary arm 162 of the ALR pawl 146 is released from the opening of the second guide portion 166B of the guide groove 166, and the ALR pawl 146 is thereby rotated about the support shaft 150 in the direction apart from the locking wheel 18, as shown in FIG. 23. As a result, as shown in FIG. 24, the pawl portion 152 of the ALR pawl 146 is separated from and thereby disengaged from the externally toothed ratchet wheel 20 of the locking wheel 18. Moreover, this state in which the ALR pawl 146 is disengaged from the locking wheel 18 is maintained by the compressed coil spring 158. As a result, the webbing take-up device 140 is switched to the ELR state where the ALR pawl 146 is spaced from the locking wheel 18.

As described above, in the webbing take-up device 140 relating to the second embodiment of the present invention, when the webbing take-up device 140 is to be switched from the ELR mode to the ALR mode, by unwinding the entire amount of the webbing, the first protrusion 174 of the releasing gear 164 presses and rotates the releasing arm 154 of the ALR pawl 146 such that the auxiliary arm 162 of the ALR pawl 146 abuts against the releasing gear 164, and that the ALR pawl 146 is separated (disengaged) from the locking wheel 18. Further, from this state in which the entire amount of the webbing has been unwound, by taking up a predetermined amount of the webbing, the releasing gear 164 is disposed at a position where the auxiliary arm 62 is able to enter the guide groove 166 of the releasing groove 166. Also, after that, by unwinding the entire amount of the webbing again, the releasing gear 164 rotates so that the auxiliary arm 162 enters the guide groove 166 and the ALR pawl 146 then rotates to engage with the locking wheel 18. As a result, the switching to the ALR mode is carried out.

As described above, in the webbing take-up device 140 relating to the second embodiment of the present invention, the switching from the ELR mode to the ALR mode is achieved by conducting the respective unwinding and taking-up operations of the webbing twice in sequential order. Accordingly, unless the aforementioned switching is carried out by the conscious volition of the vehicle occupant, an unintended and unnecessary switching from the ELR mode to the ALR mode which may make the vehicle occupant feel unpleasant does not happen.

Further, as a result, it is not necessary to set the overall length of the webbing to be much longer than the length ordinarily required to harness the vehicle occupant. Therefore, increases in size and cost can be avoided.

Third Embodiment

Figure 25:
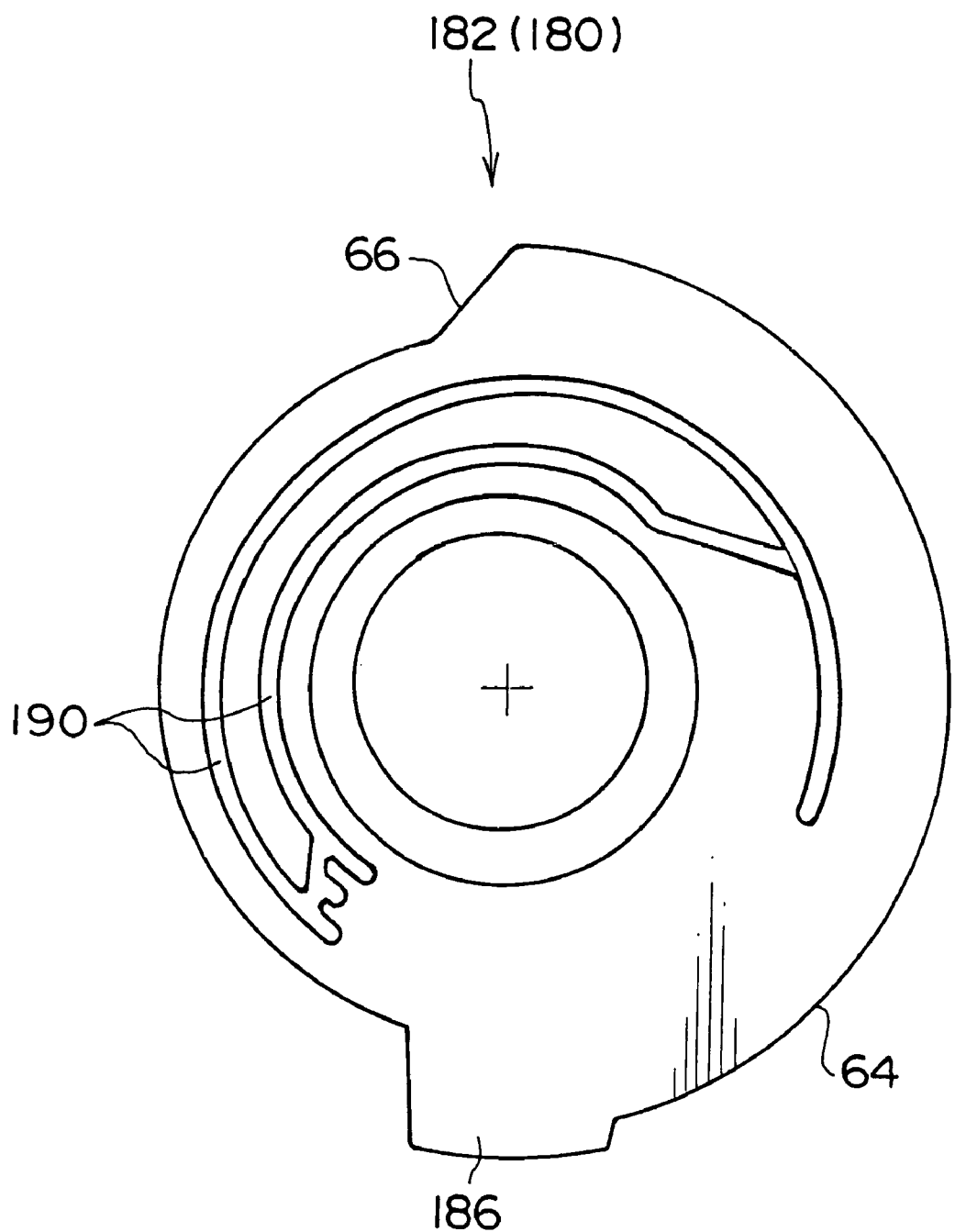
FIG. 25 is a front view of a structure of a cam member of a webbing take-up device relating to a third embodiment of the present invention.
Figure 26:
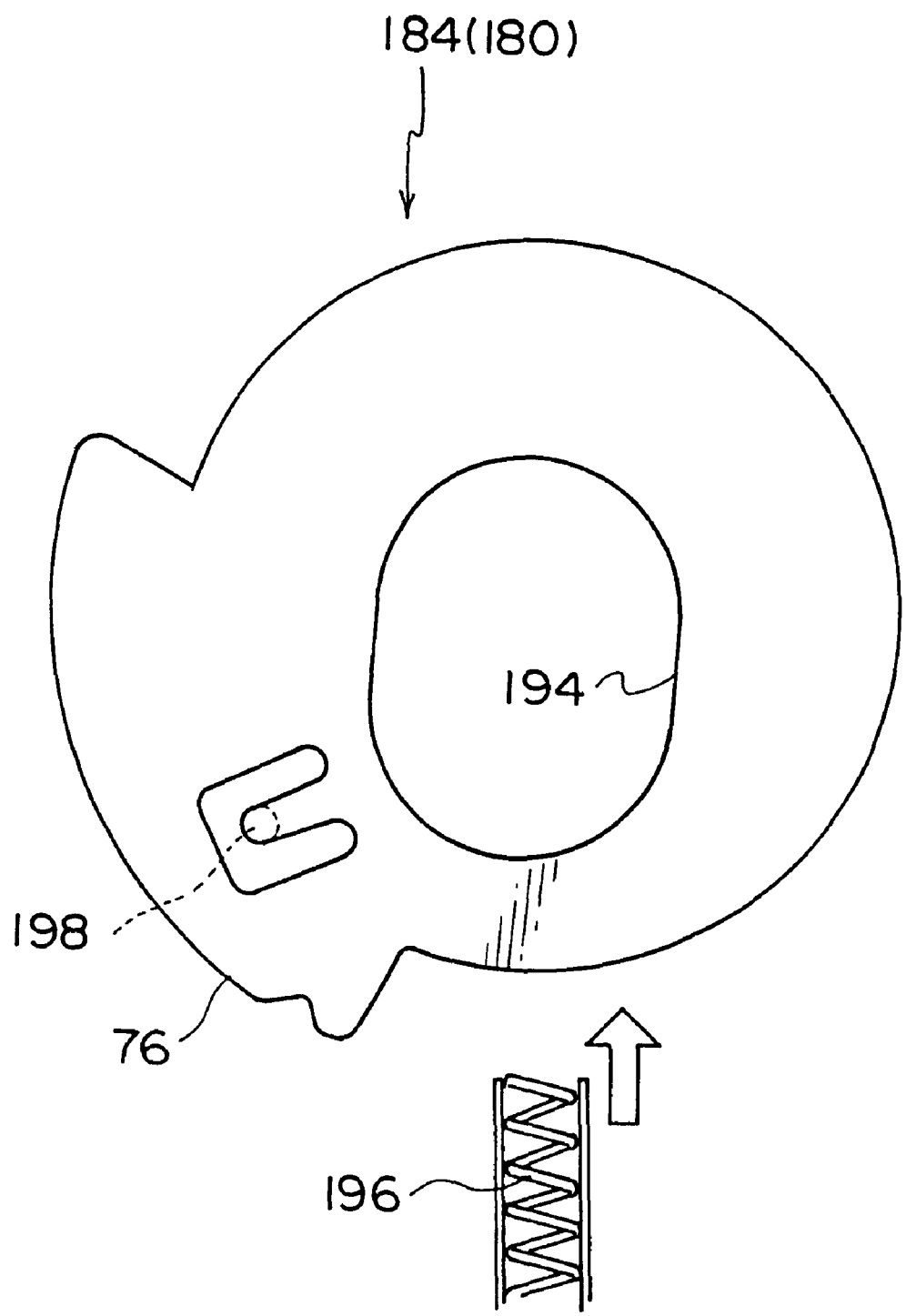
FIG. 26 is a front view of a structure of a disc control of the webbing take-up device relating to the third embodiment of the present invention.

FIGS. 25 and 26 each show a front view of a structure of main components of the webbing take-up device 180 relating to a third embodiment of the present invention.

The webbing take-up device 180 is composed of parts basically similar to those used in the webbing take-up device 10 relating to the above-described first embodiment, except that a cam member 182 and a disc control 184 are provided instead of the cam member 32 and the disc control 30. It should be noted that description and explanation of the parts basically the same as those of the webbing take-up device 10 will be omitted.

Figure 27:
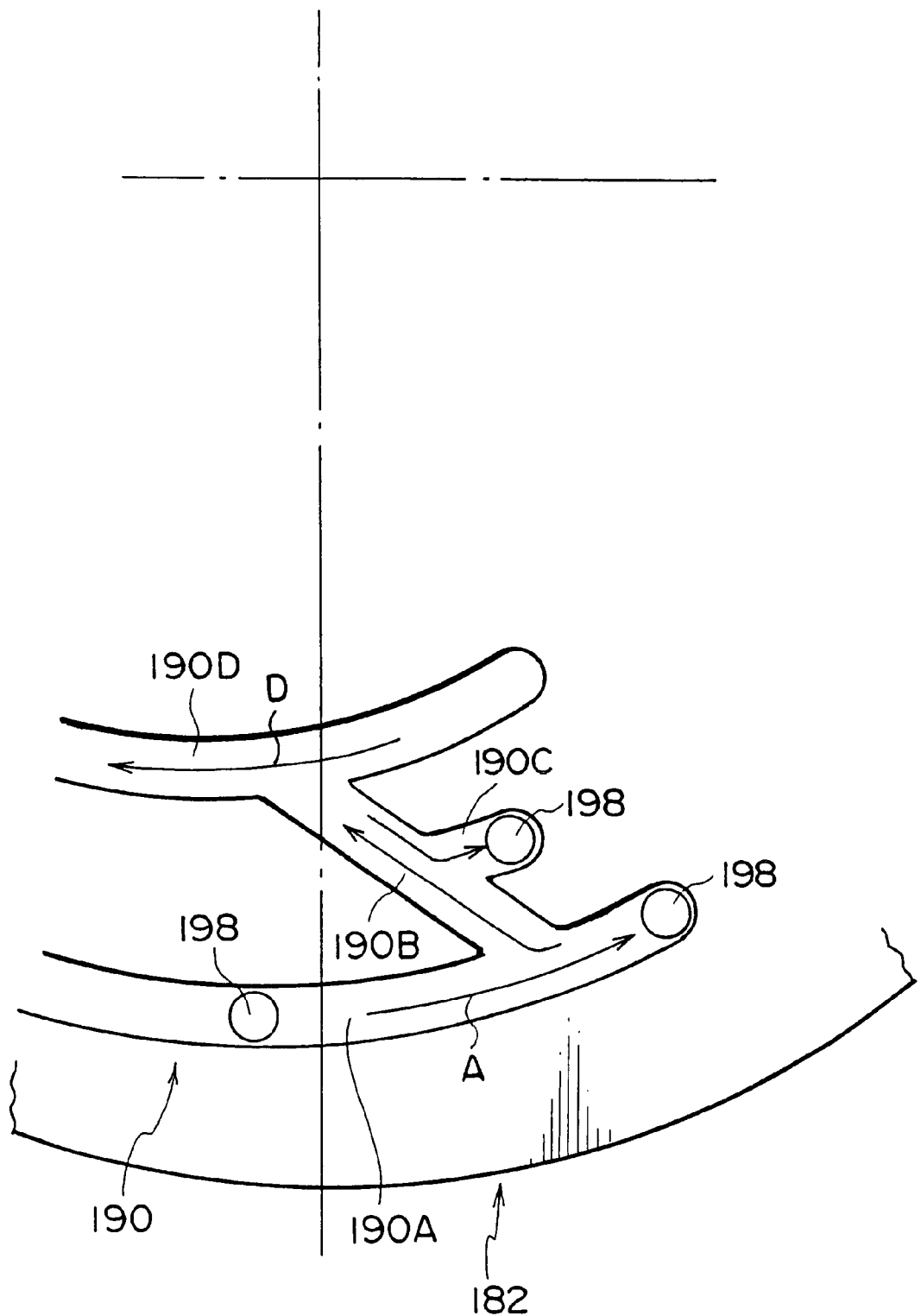
FIG. 27 is a front view of a structure of a guide groove formed at the cam member of the webbing take-up device relating to the third embodiment of the present invention.

As shown in FIG. 25, generally the cam member 182 is substantially disc-shaped, similar to the cam member 32 relating to the above-described first embodiment. A cam protrusion 186 and a braking portion 64 are formed integrally with the cam member 182 at an outer circumference thereof. Further, a guide groove 190 is formed at the cam member 182. As shown in FIG. 27, the guide groove 190 is composed of a first guide path 190A disposed outwardly in the radial direction and a fourth guide path 190D which is formed concentric with the first guide path 190A and disposed inwardly in the radial direction. Further, a second guide path 190B is formed in the vicinity of one end portion of each of the first guide path 190A and the fourth guide path 190D. The second guide path 190B links the guide paths 190A and 190D and is provided in a manner it returns from the first guide path 190A to the fourth guide path 190D. (The second guide path 190B links the guide paths 190A and 190D and is provided in a manner in which the guide pin 198, which is mentioned later, moving in the first guide path 190A in a direction which is indicated by the arrow A in FIG. 27 can move in the fourth guide path 190D in a direction which is indicated by arrow D in FIG. 27 and which is opposite to the direction which is indicated by the arrow A.) Furthermore, a third guide path 190C is disposed substantially halfway of the second guide path 190B and is continuous with the second guide path 190B. As shown in detail in FIG. 28, a fifth guide path 190E is formed in the vicinity of the other end portions of the first guide path 190A and the fourth guide path 190D. The fifth guide path 190E links the first and the fourth guide paths 190A and 190D and is provided in a manner that it continues from the other end of the fourth guide path 190D toward the vicinity of the other end of the first guide path 190A.

Figure 29:
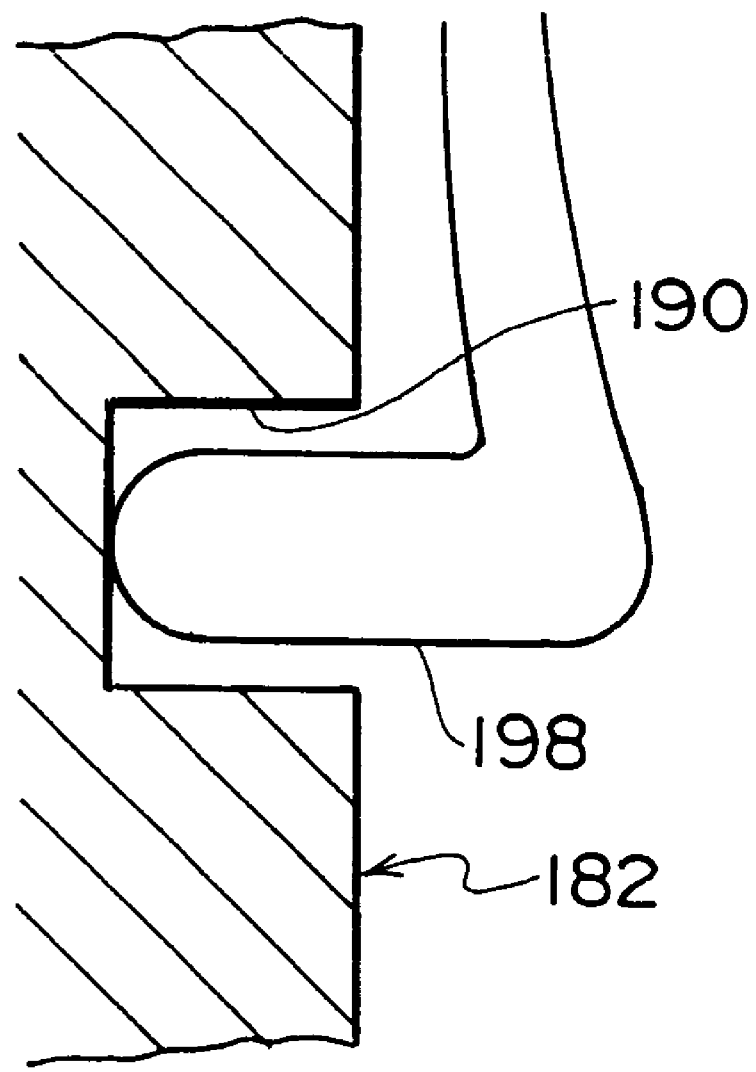
FIG. 29 is a cross-sectional view of the structure of the guide groove formed at the cam member of the webbing take-up device relating to the third embodiment of the present invention.

As shown in FIG. 29, a guide pin 198 of the disc control 184, which will be described later, is fitted into the guide groove 190 comprising these guide paths.

Figure 30:
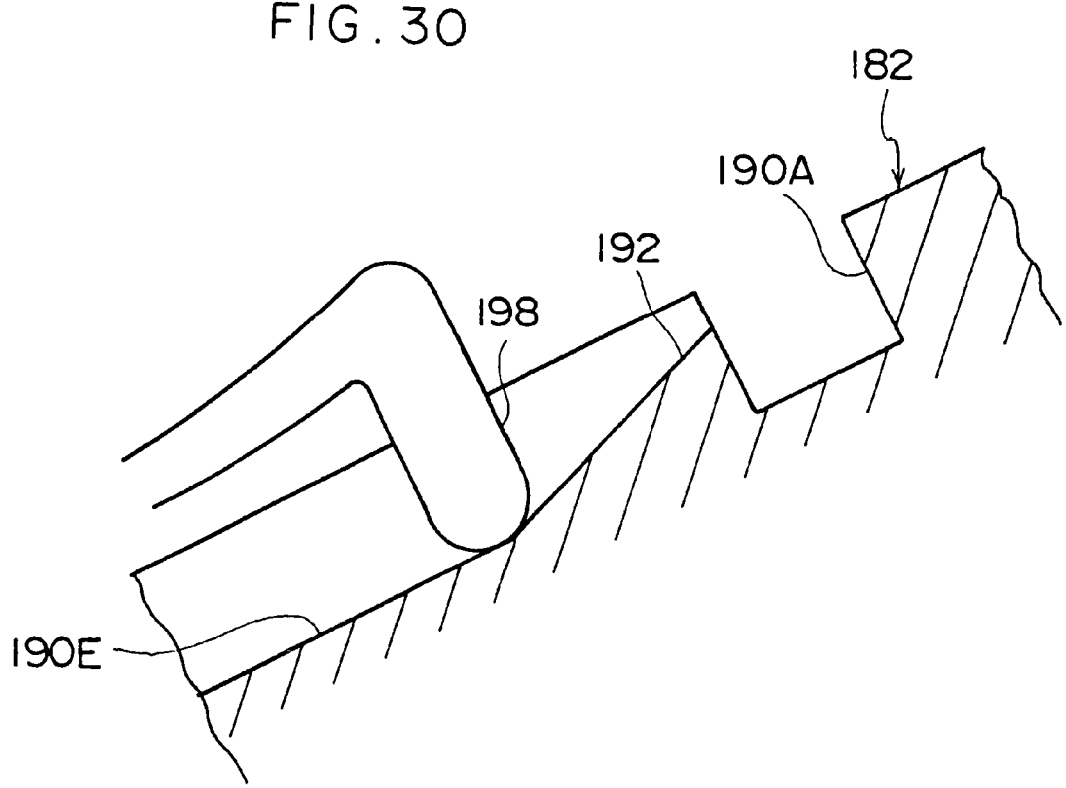
FIG. 30 is a cross-sectional view of the structure the guide groove formed at the cam member of the webbing take-up device relating to the third embodiment of the present invention.

As shown in FIG. 30, a saw tooth-shaped tapered protrusion 192 is formed at the portion where the fifth guide path 190E and the first guide path 190A communicate with each other.

As shown in FIG. 26, similar to the disc control 30 of the first embodiment, generally the entire body of the disc control 184 is substantially disc-shaped. An elliptical opening 194 for support is provided at the central portion of the disc control 184. Accordingly, the disc control 184 is able to move within a predetermined range in the elliptical major axial direction and is generally urged by a spring 196 in a direction separate from an ALR pawl 22 which will be described later.

A braking operational portion 76 for the ALR pawl 22 (described later) is formed integrally with the disc control 184 at an outer circumference thereof; similar to the disc control 30 of the webbing take-up device 10 relating to the first embodiment of the present invention.

A guide pin 198 is formed integrally with the disc control 184 by notching a portion thereof. The guide pin 198 protrudes toward the cam member 182 side and is fitted into the guide groove 190 of the cam member 182. Accordingly, when the cam member 182 rotates, the guide pin 198 is guided along the guide groove 190 (at this time, the disc control 184 is moved in the axial direction thereof). When the cam member 182 rotates in a state in which the guide pin 198 reaches a predetermined end portion of the guide groove 190, the disc control 184 is thereby pressed and rotated.

Here, the dimension of each of one end portions of the first guide path 190A and the fourth guide path 190D of the guide groove 190 is set such that, even in a state in which the entire amount of the webbing is unwound, the end portions do not abut against the guide pin 198 of the disc control 184. Moreover, the dimension of the end portion of the third guide path 190C of the guide groove 190 is set such that, in a state just before the entire amount thereof is unwound, the end portion abuts against the guide pin 198 of the disc control 184 (known as "bottoming").

The ALR pawl 22 with which the webbing take-up device 180 is provided basically has the same structure as the ALR pawl 22 relating to the first embodiment described above. In the ALR pawl 22, a driven platform 116 is formed integrally therewith, but the tongue introducing portion 136 is omitted.

Next, an operation of the webbing take-up device 180 relating to the third embodiment of the present invention and a movement of the ALR/ELR switching mechanism will be explained.

In a state in which the entire amount of the webbing is taken up, similar to the webbing take-up device 10 relating to the above-described first embodiment, the driven platform 116 of the ALR pawl 22 runs onto the braking operational portion 76 of the disc control 184 so that the pawl portion 108 of the ALR pawl 22 is separated from and not allowed to engage with the externally toothed ratchet wheel 20 of the locking wheel 18. The guide pin 198 of the disc control 184 is disposed in the first guide path 190A of the guide groove 190 of the cam member 182. That is, in this state, the webbing can be freely unwound.

Next, when a vehicle occupant seated on the seat starts to unwind the webbing, the rotation of the cam member 182 allows a state that the sensor pawl 24 can engage with the externally toothed ratchet wheel 20 (i.e., an ELR mode) in the same way as described before.

The operation in which the mode of use of the webbing take-up device 180 is switched from the ELR mode to the ALR mode will next be described. It should be noted that, in FIGS. 27 and 28, the relative movement of the guide pin 198 is indicated by arrows for simplicity of explanation.

When a state is reached in which the harnessing range of the webbing is exceeded and the entire amount of the webbing is unwound from a state in which the webbing is harnessed (i.e., an ELR mode), the cam member 182 rotates and the guide pin 198 of the disc control 184 thereby moves relatively along the first guide path 190A of the guide groove 190 and gradually come close to the vicinity of the end portion of the first guide path 190A. In this state, the guide pin 198 does not abut against the end portion of the first guide path 190A and the rotation of the cam member 182 is not transmitted to the disc control 184.

Then, a predetermined amount of the webbing is taken up from this state in which the entire amount of the webbing has been unwound. With this unwinding operation, the guide pin 198, in the first guide path 190A of the guide groove 190, enters the second guide path 190B. At this time, the disc control 184 moves in the axial direction thereof so that the relative movement of the guide pin 198 and the guide groove 190 can be smoothly carried out.

After that, the entire amount of the webbing is unwound again (for a second time) from the state in which the predetermined amount of the webbing has been taken up. With this unwinding operation, the guide pin 198, in the second guide path 190B of the guide groove 190, enters the third guide path 190C. In a state just before the entire amount of the webbing is unwound, the guide pin 198 abuts against the end portion of the third guide path 190C of the guide groove 190. Furthermore, by unwinding the entire amount of the webbing, the rotation of the cam member 182 is transmitted to the disc control 184 to rotate the same. As a result, the driven platform 116 of the ALR pawl 22 which had run over the braking operational portion 76 of the disc control 184 is placed on the cam protrusion 186 of the cam member 182. Accordingly, at this time, the ALR pawl 22 is still unable to engage with the externally toothed ratchet wheel 20.

In a situation in which a take-up amount exceeds a predetermined amount at the time that the entire amount of the webbing is once again to be unwound from a state in which the predetermined amount of the webbing has been taken up, the guide pin 198 does not enter the third guide path 190C from the second guide path 190B of the guide groove 190, but moves to the fourth guide path 190D as it is at the time the webbing has been unwound thereafter.

After the guide pin 198 in the second guide path 190B of the guide groove 190 has entered the third guide path 190C and the entire amount of the webbing has been unwound again, the webbing is taken up again from the state in which the entire amount of the webbing is unwound. With this taking-up operation of the webbing, the guide pin 198 in the third guide path 190C of the guide groove 190 moves to the fourth guide path 190D. Because the cam member 182 rotates in the direction opposite to the direction described above, the cam protrusion 186 gradually moves apart from the braking operational portion 76 of the disc control 184. Accordingly, at the time when a sufficient amount of the webbing is taken up for the cam protrusion 186 to be separated from the driven platform 116 of the ALR pawl 22, the pawl portion 108 of the ALR pawl 22 engages with the externally toothed ratchet wheel 20 of the locking wheel 18 due to the urging force from the twisted coil spring 112. As a result, the webbing take-up device 180 is switched to the ALR mode of use.

Figure 28:
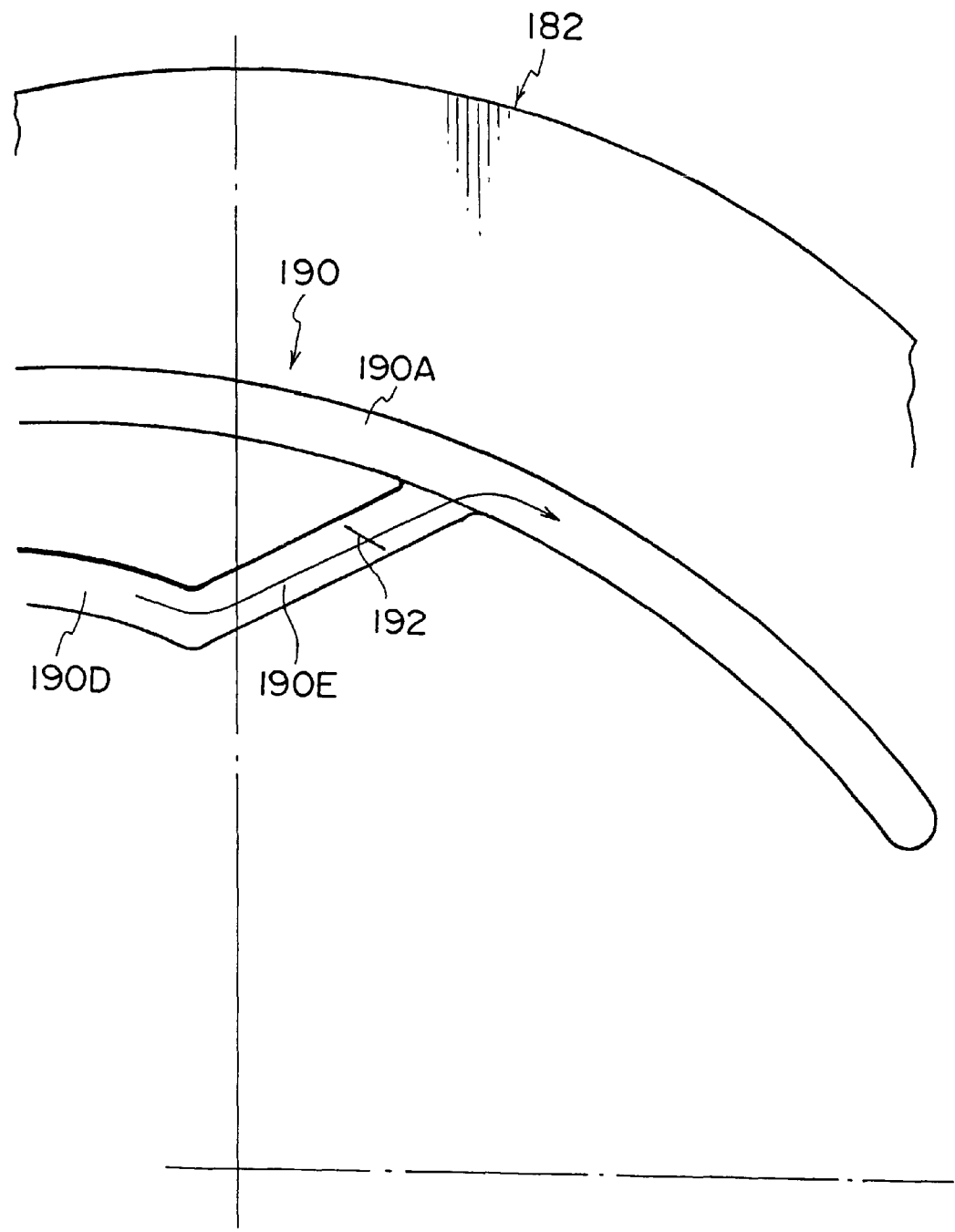
FIG. 28 is a front view of the structure of the guide groove formed at the cam member of the webbing take-up device relating to the third embodiment of the present invention.

When the webbing take-up device 180 is to return to the ELR mode of use after switching to ALR as described above, a sufficient amount of the webbing is taken up. When an amount of webbing greater than the amount ordinarily required to harness a vehicle occupant is taken up during ALR mode, a guide surface portion 66 of the cam member 182 pushes the driven platform 116 of the ALR pawl 22 from downward. Moreover, the cam protrusion 186 presses and rotates the disc control 184 and the driven platform 116 of the ALR pawl 22 is pushed and lifted onto the braking operational portion 76 of the disc control 184. Further, as shown in FIG. 28, the guide pin 198 of the disc control 184 in the fourth guide path 190D of the guide groove 190 of the cam member 182 moves to the other end portion of the first guide path 190A via the fifth guide path 190E.

As a result, the webbing take-up device 180 is switched to an ALR released state in which the pawl portion 108 of the ALR pawl 22 is separated from and not allowed to engage with the externally toothed ratchet wheel 20 of the locking wheel 18. Namely, the webbing take-up device 180 is reset to the above-described initial mode.

Here, when the webbing take-up device 180 is switched from the ALR mode of use to the ELR mode of use, the guide pin 198 of the disc control 184 moves from the fourth guide path 190D of the guide groove 190 to the first guide path 190A via the fifth guide path 190E. Because the tapered protrusion 192 is formed at the portion where the fifth guide path 190E and the first guide path 190A communicate with each other, the guide pin 198 does not unnecessarily return from the first guide path 190A to the fifth guide path 190E, and, accordingly, unless the above-described switching operation is carried out, the switching from the ELR mode to the ALR mode is not caused.

As described above, in the webbing take-up device 180 relating to the third embodiment of the present invention, when the webbing take-up device 180 is switched from the ELR mode to the ALR mode, by unwinding the entire amount of the webbing again after taking up a predetermined amount of the webbing from the state in which the entire amount of the webbing is unwound, one end portion of the third guide path 190C of the guide groove 190 of the cam member 182 interlocking with the take-up shaft 14 presses the guide pin 198 to rotate the disc control 184. With this rotation of the disc control 184, the ALR pawl 22 is moved from the braking operational portion 76 to the cam member 182. Moreover, by taking up webbing again from this state in which the entire amount of the webbing has been-unwound, the cam member 182 rotates and separated (disengages) from the ALR pawl 22. As a result, the mode of the webbing take-up device 180 is switched to the mode of use for ALR in which the ALR pawl 22 engages with the locking wheel 18 to prevent the same from rotating.

As described above, in the webbing take-up device 180 relating to the third embodiment of the present invention, the switch of the ELR mode of use to the ALR mode of use is achieved by conducting the respective unwinding and taking-up operations of the webbing twice in sequential order. Accordingly, unless the aforementioned switching is carried out by the conscious volition of the vehicle occupant, an unintended and unnecessary switching from the ELR mode to the ALR mode which may make the vehicle occupant feel unpleasant does not happen.

Further, as a result, it is not necessary to set the overall length of the webbing to be much longer than the length ordinarily required to harness the vehicle occupant. Therefore, increases in size and cost can be avoided.

As described above, the webbing take-up device relating to the present invention has an excellent effect in that unintended and unnecessary switching from the ELR mode to the ALR mode can be prevented.

What is claimed is:

1. A webbing take-up device which operates in one of an ELR mode in which, in only a case of a vehicular emergency, a rotating of a take-up shaft of a webbing in a direction in which the webbing is unwound is prevented, and an ALR mode in which, after a predetermined amount of the webbing is unwound, an unwinding of the webbing is always prevented, comprising:

means for switching from said ELR mode to said ALR mode by, in said ELR mode, unwinding an entire amount of the webbing; taking up a predetermined amount of the webbing from said state in which the entire amount of the webbing is unwound; unwinding the entire amount of the webbing from a state in which the predetermined amount of the webbing is taken-up; and taking up the webbing from the state in which the entire amount of the webbing is unwound, in serial order; and means for switching from said ALR mode to said ELR mode by, in said ALR mode, taking up a predetermined amount of the webbing, wherein said ELR to ALR switching means includes a disc control member which is provided with a braking operational portion which engages an ALR pawl so as to keep said ALR pawl spaced from a locking wheel, and an intermediate holding surface which is disposed adjacent to said braking operational portion and which engages with said ALR pawl so as to keep said ALR pawl spaced from said locking wheel.

2. A webbing take-up device comprising:

a take-up shaft which takes up a webbing for restraining a vehicle occupant;

a locking device which engages with said take-up shaft to prevent the take-up shaft from rotating in a direction in which the webbing is unwound;

a locking wheel movably mounted on said take-up shaft for rotation with said shaft which, when prevented from rotating with said shaft, actuates said locking device such that said take-up shaft is prevented from rotating;

an acceleration detecting means which detects a state of a vehicle emergency, and which stops said locking wheel from rotating;

an ALR pawl which switches between a state in which said ALR pawl engages with said locking wheel so as to prevent said locking wheel from rotating, and a state in which said ALR pawl is spaced from said locking wheel so as to allow said locking wheel to rotate;

a reduction mechanism which operates due to an intermittent motion, comprising a driving gear which rotates integrally with said take-up shaft and a reduction gear which meshes with said driving gear;

a disc control member which is provided with a braking operational portion which engages with said ALR pawl so as to keep said ALR pawl spaced from said locking wheel, and an intermediate holding surface which is disposed adjacent to said braking operational portion and which engages with said ALR pawl so as to keep said ALR pawl spaced from said locking wheel; and a cam member which is rotated by said reduction mechanism in an interlocking manner, and which is provided with a first pressing surface and a second pressing surface for pressing said disc control member, and which engages with said ALR pawl so as to keep said ALR pawl spaced from said locking wheel, wherein said webbing take-up device operates in one of an ELR mode or an ALR mode, the switching between said ELR mode or said ALR mode being carried out by said ALR pawl which is switched between a state in which said ALR pawl prevents said locking wheel from rotating, and a state in which said ALR pawl allows said locking wheel to rotate, wherein switching from said ELR mode to said ALR mode is carried out in a manner that:

in said ELR mode, (a) when a substantially entire amount of the webbing, which is taken up by said take-up shaft, is unwound, said braking operational portion of said disc control member is disposed so as to keep said ALR pawl spaced from said locking wheel; and (b) when an entire amount of webbing is unwound in the first time, said disc control member and said cam member are disposed such that the first pressing surface of said cam member which is interlocked with said take-up shaft presses and rotates said disc control member, and said ALR pawl is moved from said braking operational portion to said intermediate holding surface;

(c) when the entire amount of the webbing is unwound again in the second time after a predetermined amount of the webbing, the entire amount of which is unwound, is taken up, said disc control member and said cam member are disposed such that the second pressing surface of said cam member which is interlocked with said take-up shaft presses and rotates said disc control member, and said ALR pawl is moved from said intermediate holding surface to said cam member, and (d) when the webbing, the entire amount of which is unwound, is taken up again, said ALR pawl engages with said locking wheel in such a manner in which said cam member which is interlocked with said take-up shaft rotates to be separated from said ALR pawl, and wherein a switching from said ALR mode to said ELR mode is carried out in a manner that:

in said ALR mode, when a predetermined amount of the webbing is taken up, said braking operational portion keeps said ALR pawl spaced from said locking wheel in a manner that said cam member presses and rotates said disc control member.

* * * * *